(12) United States Patent
Sherry

(10) Patent No.: US 8,602,320 B1
(45) Date of Patent: Dec. 10, 2013

(54) EXPANSION NOZZLE WITH MOTOR DRIVE

(76) Inventor: Raymond C. Sherry, Cleburne, TX (US)

( * ) Notice: Subject to any disclaimer, the term of this patent is extended or adjusted under 35 U.S.C. 154(b) by 573 days.

(21) Appl. No.: 12/804,996

(22) Filed: Aug. 3, 2010

Related U.S. Application Data

(63) Continuation-in-part of application No. 12/156,216, filed on May 31, 2008, now Pat. No. 7,963,459, which is a continuation of application No. 12/156,217, filed on May 31, 2008, now Pat. No. 8,097,128.

(60) Provisional application No. 60/932,752, filed on Jun. 1, 2007.

(51) Int. Cl.
B05B 17/04 (2006.01)

(52) U.S. Cl.
USPC ............. 239/11; 239/106; 239/114; 239/123; 239/453; 239/533.1; 239/533.7; 239/584; 239/585.1; 141/116

(58) Field of Classification Search
USPC ............... 239/1, 11, 104, 106, 114–118, 123, 239/102.1, 102.2, 142, 144, 451–453, 239/533.1, 533.7, 533.9, 584, 585.1; 251/129.11, 129.12, 129.2; 137/242–244, 331; 141/116
See application file for complete search history.

(56) References Cited

U.S. PATENT DOCUMENTS

| | | | | |
|---|---|---|---|---|
| 4,460,009 A | * | 7/1984 | Nanci et al. | 137/243.6 |
| 4,627,461 A | * | 12/1986 | Gordon | 251/129.11 |
| 4,648,421 A | | 3/1987 | Chant et al. | |
| 5,968,312 A | | 10/1999 | Sephton | |
| 6,119,716 A | * | 9/2000 | Wright | 137/243.6 |

* cited by examiner

*Primary Examiner* — Steven J Ganey
(74) *Attorney, Agent, or Firm* — Roger N. Chauza, PC

(57) ABSTRACT

An expansion nozzle adapted for use in processing high pressure, high temperature liquids. A spring biases a nozzle head into contact with a nozzle seat, but the high pressure liquids processed by the nozzle move the nozzle head away from the nozzle seat to form an orifice therebetween. A motor rotates the nozzle head with respect to the nozzle seat during dynamic operation to grind particles lodged in the orifice. A threaded nut and a catch mechanism are effective to adjust the spring tension and thus the force of the upstream pressurized liquid needed to operate the nozzle. The nozzle can process liquids having gasses, slurries and high concentrations of particulate matter.

19 Claims, 15 Drawing Sheets

EXPANSION NOZZLE WITH MOTOR DRIVE

RELATED APPLICATIONS

This is a continuation-in-part patent application of non-provisional patent application Ser. No. 12/156,216 filed May 31, 2008 now U.S. Pat. No. 7,963,459, which claims the benefit of U.S. Provisional Application No. 60/932,752, filed Jun. 1, 2007. This CIP patent application is also related to non-provisional patent application filed May 31, 2008 now U.S. Pat. No. 8,097,128, Ser. No. 12/156,217, by Raymond C. Sherry, and entitled "Method and Apparatus for Purifying Water."

TECHNICAL FIELD OF THE INVENTION

The present invention relates in general to liquid nozzles, and more particularly relates to high pressure liquid nozzles that are of the self cleaning type.

BACKGROUND OF THE INVENTION

The use of a nozzle is necessary in many pressurized systems that process liquids. Nozzles are especially useful, and indeed often necessary, in systems where high pressure, hot water is flashed into steam and then condensed to produce a more purified form of water. Sea water, gas and oil well production water, and other forms of water are processed in this manner to remove many of the contaminants and produce a more usable form of water.

Water purification systems employing evaporation or distillation principles often use a pump to pressurize the raw water, and a heater to heat the water to a high temperature. The heated water is then processed through a nozzle in an expansion chamber where the hot water flashes into steam. The portion of the heated water that does not flash into steam is removed, and the steam is carried to a condensation unit where the steam is condensed into the more purified form of water.

There are many sophisticated water purification systems that process large quantities of water through complicated processes to obtain pure water. Because of the complexity, the systems represent a substantial capital expenditure, and are often operated on a continuous basis in order to produce the desired amount of pure water. As such, it is imperative that the system and the components thereof perform reliably so that maintenance and repair is kept to a minimum. One component of such type of system that requires routine maintenance is the nozzle that transforms the high pressure, hot water into droplets that are flashed into steam in the expansion chamber. The dirtier the water that is processed, the more often the nozzle requires maintenance to remove deposits formed in the orifices, or to remove particulate matter that is too large to pass through the orifices. Often, filtration of the raw water is desirable to remove some of the particulate matter, however, the flash expansion process itself can form calcified deposits where they did not exist before in the stream of raw water. It can be appreciated that the system operation must be temporarily halted in order to replace the nozzle or otherwise remove the residue and deposits in the nozzle orifices. Because of the constant problem of nozzle failure, many water purification systems require regular monitoring to assure that the system is operating satisfactorily. In systems that process dirtier forms of water, and toxic water, the systems must be attended by an operator to provide continuous monitoring of system operation. This increases the overall operational cost of the system as well as the resulting product.

Evaporation nozzles heretofore known in the field can be constructed with no moving parts to increase the reliability and reduce the cost of the system. See for example, U.S. Pat. Nos. 3,930,960 by Taylor; 4,953,694 by Hayashi et al.; and 5,955,135 by Boucher et al. These types of nozzles simply pass the pressurized water through an opening or orifice to create a mist that flashes into steam when exposed to a reduced-pressure environment. As noted above, the orifices can become clogged or become less effective due to residue buildup on the orifice areas. Moreover, since these simple nozzles have no moving parts, they are not capable of responding to changes in the various parameters of the liquid being processed to change the operating conditions of the system.

In the flash expansion systems of the type that heat the raw water to a high temperature, and pressurize the water with a pump, it is necessary to maintain the pressure of the heated water under control so that inadvertent flashing of the heated raw water does not prematurely occur in the system, other than at the expansion nozzle. Such an occurrence presents a corrosive condition to the system apparatus, thus severely shortening the life of the components. Thus, the pressure of the heated raw water must be monitored, and if changes are noted, such as a lowered pressure, then a control system must be responsive to such change and increase the speed of the pump or otherwise change other system parameters to restore the water pressure to the desired value. While this pressure control is certainly possible, and often necessary, the added components complicate the system and make it more costly. It would be desirable if the system could be at least partially controlled in this manner with the nozzle itself to control the orifice and regulate the pressure of the raw, heated water to maintain the same within desired limits so that premature flashing of the hot water does not occur.

From the foregoing, it can be seen that a need exists for an improved nozzle that is responsive to changes in various parameters of the liquid being processed to change the operating conditions of the system. Another need exits for a nozzle that is self cleaning and effective to pass particulate matter that is large enough to clog the orifice. Yet another need exists for a nozzle that is actuated to perform a cleaning routine that laps the surface areas of the orifice to remove deposits thereon. Still another need exists for a nozzle adapted for allowing a stem to be rotated during dynamic operation of the nozzle to thereby grind particulate matter lodged in the orifice. Another need exists for a nozzle structure that is designed to operate for long periods of time while processing dirty, particulate-laden liquids, and in harsh high temperature, high pressure environments. A further need exists for a nozzle that is processor-controlled to provide nozzle orifice adjustments automatically and remotely, as well as provide lapping of the orifice surfaces.

SUMMARY OF THE INVENTION

In accordance with the principles and concepts of the invention, disclosed is an expansion nozzle in which the nozzle head is spring biased against the nozzle seat, but the force of the pressurized liquid processed by the nozzle counteracts the spring bias and opens the nozzle orifice. The nozzle head continuously rotates during dynamic operation with respect to the nozzle seat to grind particulate matter lodged therebetween.

According to another feature of the invention, the nozzle is constructed so that the nozzle head can continue rotating during operation thereof, while the spring bias can be adjusted to thereby adjust the pressure of the upstream pressurized liquid needed to operate the nozzle.

Because of the structural and operational features of the nozzle assembly, a number of different types of fluids can be processed, including slurries, suspended particulate matter, oils, organic vapors, gases, etc. These types of fluids, even when at elevated temperatures and pressures, can be passed through the nozzle without disruption or compromise of the efficiency or integrity of the system. This is especially important in systems that recirculate a portion of the incompletely-processed liquid, or process the liquids in a series of processes to further refine the liquids, where the downline liquids become more concentrated with particulate matter, sludge and other undesirable material.

According to yet another feature of the invention, the nozzle assembly is completely housed as a unit, whereby removal and replacement thereof in an expansion chamber is facilitated.

With respect to another feature of the invention, disclosed is a nozzle assembly in which the nozzle head is continually rotated during operation, and a paddle is connected thereto so that liquid can be stirred by the nozzle assembly.

In accordance with one embodiment of the invention, disclosed is a nozzle for use with a pressurized liquid. The nozzle includes a first and second nozzle member, at least one of the first or second nozzle members is movable with respect to the other nozzle member to provide an orifice therebetween for spraying the pressurized liquid therefrom. At least one spring biases the first and second nozzle members toward a closed position in which the orifice is closed. The spring has a force counteracted by a force of the pressurized liquid during dynamic operation of the nozzle to move the movable nozzle member and change the orifice area. Included also is an electrical drive apparatus providing rotary power to the nozzle. A nozzle shaft is connected to the movable nozzle member, and the nozzle shaft is driven by the electrical drive apparatus for rotating the movable nozzle member. A spring force adjustment mechanism is used for adjusting the force of the spring to thereby adjust the force by which the pressurized liquid moves the movable nozzle member.

According to another embodiment of the invention, disclosed is a nozzle for use with a pressurized liquid. The nozzle includes a nozzle head and a nozzle seat, where the nozzle head is movable with respect to the nozzle seat to provide an orifice therebetween for spraying the pressurized liquid therefrom. A nozzle shaft is connected to the nozzle head, and the nozzle shaft has a threaded portion. Further included is a stationary plate and a movable plate, and a plurality of springs located between the stationary plate and the movable plate. The nozzle seat is fixed against movement with the stationary plate, and the springs bias the movable plate away from the stationary plate. The springs have a force that is counteracted by a force of the pressurized liquid during dynamic operation of the nozzle to move the movable plate and change the orifice area. A reversible motor rotates the nozzle shaft and the nozzle head clockwise and counterclockwise. A threaded nut engages with the threaded portion of the nozzle shaft. The threaded nut has a hole therein, and the threaded nut bears against the movable plate so that when the threaded nut moves along the threaded portion of the nozzle shaft, the movable plate moves axially with the threaded nut. A spring-loaded plunger is attached to the nozzle shaft. The spring-loaded plunger is adapted for engagement within the hole in the threaded nut so that when the nozzle shaft rotates the spring-loaded plunger rotates therewith and carries with it the threaded nut when engaged with the spring-loaded plunger. A solenoid is attached to the stationary plate. The solenoid has a plunger adapted for engagement within the hole in the threaded nut, and when the solenoid plunger engages within the hole in the threaded nut, the solenoid plunger displaces the spring-loaded plunger from the threaded nut hole to thereby stop rotational movement of the threaded nut while the nozzle shaft remains rotatable.

With regard to yet another embodiment of the invention, disclosed is a method of operating a nozzle for use with a pressurized liquid. The method includes spacing a first nozzle member from a second nozzle member to form an orifice so that the pressurized liquid is sprayed therefrom. The first nozzle member is rotated with respect to the second nozzle member during dynamic operation of the nozzle to grind particulate matter lodged in the orifice. The rotation of said first nozzle member is maintained during axial movement thereof until a nozzle surface of the first nozzle member contacts a nozzle surface of the second nozzle member, whereby relative rotational movement between the first and second nozzle members is effective to lap the nozzle surfaces. After lapping the nozzle surfaces, the first nozzle member is moved axially away from the second nozzle member to form an orifice so that the pressurized liquid is sprayed between the lapped surfaces of the respective nozzle members.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
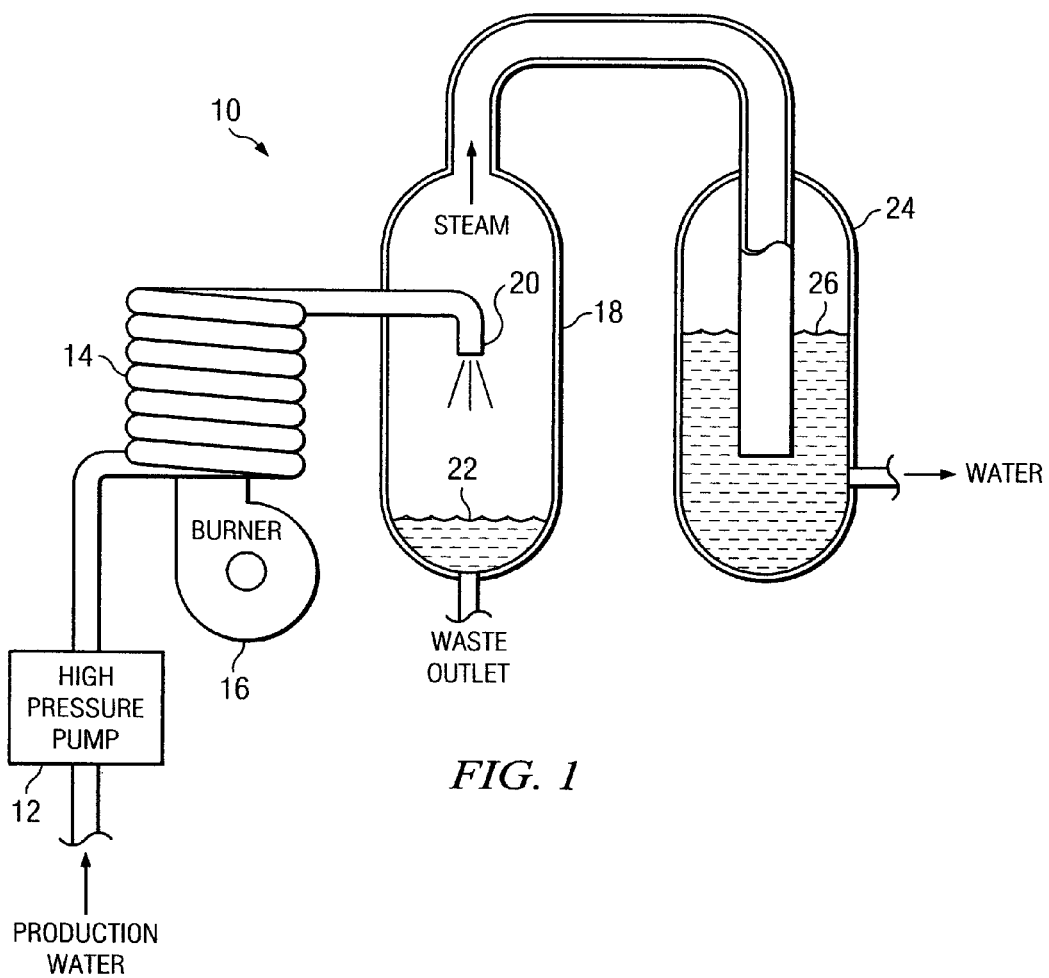
FIG. 1 is a diagram of a water purification system in which the invention can be advantageously practiced.

With reference to FIG. 1, there is shown an environment 10 in which the invention can be advantageously practiced. One application of the invention involves the processing of production water from a gas well to provide purified water that is environmentally safe for human consumption, or for returning to the ground via lakes, rivers, streams, or for agricultural irrigation purposes. The water purification system is shown in rudimentary form in FIG. 1, but is described in detail in pending patent application entitled "Method and Apparatus for Purifying Water," by Raymond C. Sherry, filed May 31, 2008, and assigned Ser. No. 12/156,217.

The production water that is generated during extraction of gas from a well is coupled to a high pressure positive displacement pump 12, which is preferably capable of pumping the production water at pressures as high as 5,000 pounds-per-square-inch (psi), and preferably about 2,000 psi to 3,500 psi. In the preferred form of the invention, the pump 12 is driven by an engine at about 800 rpm to produce pressurized liquids at a constant rate of about nine gallons per minute. The pressurized production water is pumped through a helical coil 14 which is heated by a high efficiency burner 16. The burner 16 is preferably capable of heating the production water flowing through the helical coil 14 to temperatures between about 500 and 700 degrees F., and preferably 600 degrees F. Under these conditions, the production water remains in the liquid state in the system. The high pressure, high temperature production water is then coupled to an expansion chamber 18 employing an expansion nozzle 20.

Expansion nozzles are frequently employed to flash high pressure, high temperature liquids into steam so that evaporation can occur. Where production water from a petroleum well is processed, many liquid, solid and gas impurities are carried with the water and thus must be processed to remove the same. As such, the processing system must be capable of processing the impurities with the water without disruption or undue deterioration of the components of the system. One component that is susceptible to clogging and operational failure in water purification systems employing evaporation and condensation techniques, is the expansion nozzle. In such systems, the nozzles are frequently clogged by debris that forms during the expansion of the high temperature, high pressure liquid while being transformed from the liquid phase to the gas or steam phase.

In the embodiment of the invention described herein, the production water of a gas well is processed to remove impurities and provide a water product that is purified and is environmentally safe. It should be understood that the expansion nozzles of the invention can find applications in many other fields. In any event, the production water is sprayed by the nozzle 20 into the expansion chamber 12 at a constant volumetric rate, and under conditions so that the pressurized water is converted to steam. The conditions in the expansion chamber are such that the pressure is about 50 psi and the temperature is in the neighborhood of about 212-240 degrees F. Other expansion chamber conditions can be employed. The particulate matter 22, and other liquid impurities resulting from the flash operation settle to the bottom of the expansion chamber 18 and can be periodically removed. Importantly, these impurities are passed through the expansion nozzle 20 and must not interrupt proper operation of the nozzle 20. The steam is carried to a condenser 24, which may be of the bubbler type, or other type, where the steam is converted to pure water 26. The pure water 26 can be extracted from the condenser 24 and used in any desired manner. This type of technique has been found to be very efficient in processing production water in which the often toxic and undesirable byproducts are removed therefrom.

The expansion nozzle 20 is subject to extreme high temperature and high pressure conditions and thus must be durable and free from clogging and other troubles. Otherwise, the system must be interrupted so that the nozzle 20 can be removed from the expansion chamber 18 and cleaned or otherwise maintained in an operable condition. The interruption of a water processing system is time consuming and costly, as the system has to be cooled down, partially dismantled, repaired, and then started up in an incremental manner until all subsystems resume operating conditions. It can be appreciated that when flashing steam from the high temperature, high pressure water, the water often has both solid and liquid, organic and inorganic contaminants therein. When the high temperature, high pressure water passes through the orifice of the nozzle, many liquid impurities calcify or otherwise harden and form deposits on the nozzle which reduce the effectiveness thereof.

Figure 2:
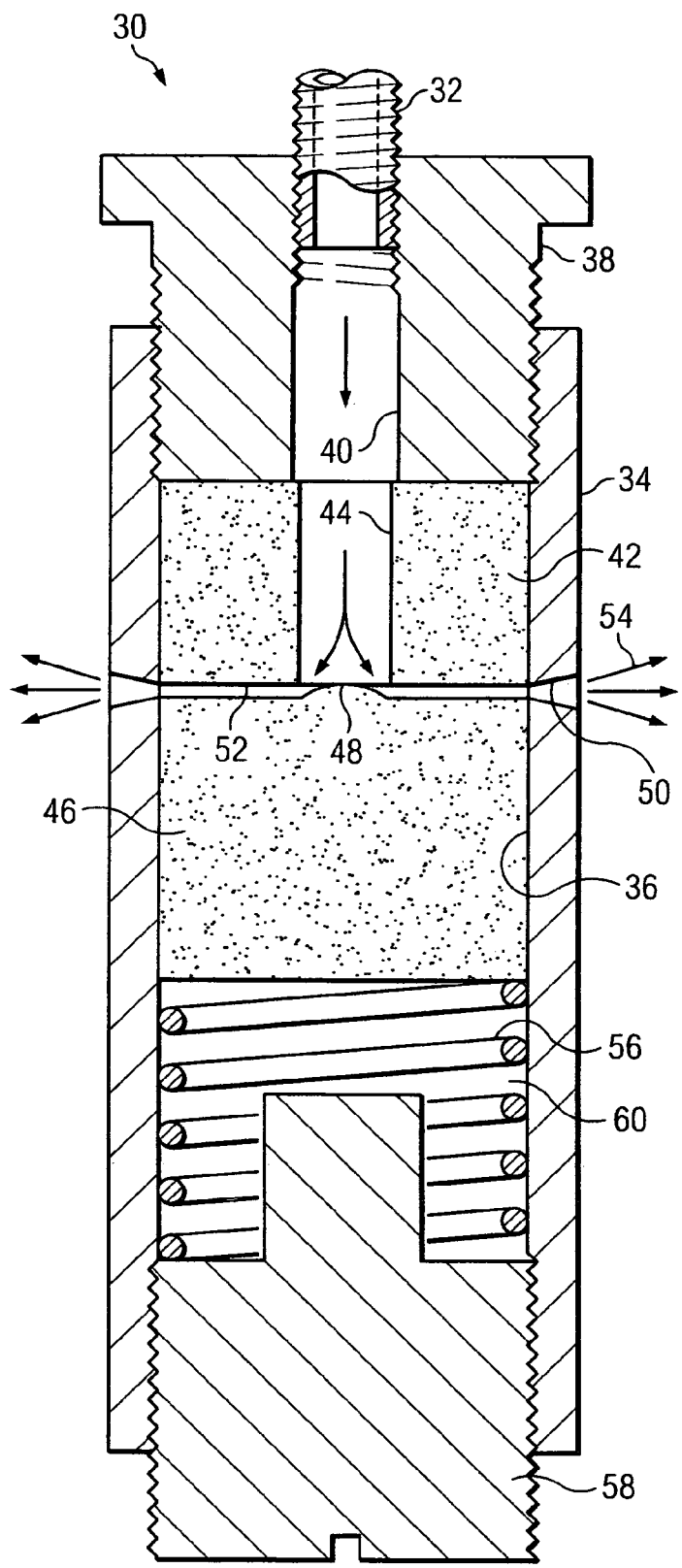
FIG. 2 is a cross-sectional view of an expansion nozzle according to one embodiment of the invention.

FIG. 2 illustrates the details of the expansion nozzle 30 constructed according to one embodiment of the invention. The expansion nozzle 30 is well adapted for operating under isobaric conditions. In other words, it is desired to maintain a constant pressure across the orifice of the expansion nozzle 30. This is preferred as it is desired to maintain the pressure of the hot water in the system sufficiently high to prevent flashing, except when emitted from the nozzle 30. If the pressure of the production water is reduced for some reason, the nozzle 30 closes somewhat to compensate for the pressure change. Conversely, if the pressure of the production water increases, the orifice of the nozzle 30 increases in area, thereby maintaining a constant flow rate as required of the positive displacement pump 12. A stainless steel tube 32 carries the pressurized hot water to the expansion nozzle 30 from the outlet fitting of the helical tubing 14. The expansion nozzle 30 includes a cylindrical body 34 constructed of stainless steel, with an axial length of about ten inches, and a wall thickness of about 0.25 inch. The inner cylindrical surface 36 of the body 34 is polished. The top of the body 34 is internally threaded to receive therein a nipple 38 having a bore 40 therethrough. The top of the bore 40 is threaded to receive the threaded end of the threaded pipe 32. A ceramic tubular member 42 is housed within the inner cylindrical surface 36 of the nozzle body 34. The ceramic member 42 includes a bore 44 axially aligned with the bore 40 of the nipple 38. Situated below the ceramic member 42 is a ceramic stem or plunger 46 which is slideable within the polished inner cylindrical surface 36 of the body 34. The top of the ceramic plunger 46 includes a domed part 48 which protrudes upwardly into the bore 44 of the ceramic member 42. The ceramic plunger 46 is spring biased upwardly in a manner described below.

Formed in the body 34 of the expansion nozzle 30 are plural orifices, one identified by numeral 50. The orifices 50 are cone shaped in a direction radially outwardly. Importantly, the orifices 50 are located in the body 34 just below the bottom surface of the ceramic member 42 so that hot pressurized water forced downwardly through the bores 40 and 44 is directed radially outwardly through the space 52 between the bottom surface of the ceramic member 42 and the top surface of the ceramic plunger 46. The pressurized water exits the orifices 50 in the manner shown by the arrows 54.

According to an important feature of the invention, the ceramic plunger 46 is movable up and down within the body 34 of the expansion nozzle 30. The ceramic plunger 46 is spring biased upwardly by a compression spring 56. The spring 56 is captured between the bottom flat surface of the ceramic plunger 46 and the top flat annular surface of an adjustable plug 58. The adjustable plug 58 is threaded into the bottom of the body 34, and is adjustable axially therewith. While not shown, the adjustable plug 58 can be locked from rotation by a lock nut. The chamber 60 in which the spring 56 operates can be filled with a fluid to provide both dampening of the movement and lubrication of the ceramic plunger 46. The spring 56 forces the ceramic plunger 46 upwardly against the ceramic member 42 when there is no fluid pressure applied to the input of the expansion nozzle 30. When the requisite 3,500 psi hot water is applied to the expansion nozzle 30, the bias of the spring 56 is overcome and the ceramic plunger 46 is forced downwardly just enough to expose the orifices 50 and allow the hot water to exit therefrom into the expansion tank 18. The bottom surface of the ceramic member 46 is flat, and the top surface (except the domed area 48) of the ceramic plunger 46 is flat. The domed top 48 of the ceramic plunger 46 facilitates the redirection of the hot water from a downward direction to a radially outward direction, and reduces turbulence of the high velocity hot water.

As soon as the hot pressurized production water exits the nozzle 30, a mist is formed. As the mist is exposed to the atmospheric pressure within the expansion chamber 18, the droplets of pressurized water flash into steam, as described above. As can be appreciated, with the high pressures used within the processing system, the water that exits the nozzle 30 is dispersed into many, very small droplets of water, which facilitates the evaporation or flashing thereof into steam. According to the principles of evaporation of hot water, with increased surface area, the evaporation is facilitated. The creation of many droplets of water emitted by the nozzle 30, effectively increases the overall surface area, thereby facilitating an efficient evaporation thereof.

The spring tension on the ceramic plunger 46 is adjusted by the adjustable plug 58 so that the vertical space of the passageway 52 is about 0.005 inch when the pressure of the hot water is about 3,500 psi. The orifices 50 are round, and are about 0.030 inch in diameter at the smallest part of the orifice 50. It is expected that there could be about four to six orifices 50 evenly spaced around the body 34 of the expansion nozzle 30. When employing a positive displacement pump operating at a pressure of about 3,500 psi, the flow rate of hot water through the expansion nozzle will be about five gallons per minute, if the water temperature is 600 degrees F. The steam conversion rate is a function of the heat added to the water in the helical coil 14, and not the temperature/flow rate of the water. The various nozzle embodiments described herein are designed to process production water at a rate of about five gallons per minute.

According to an important feature of the invention, the expansion nozzle 30 is self cleaning in the event that a particle obstructs the passage to an orifice, or the orifice itself. If a particle is large enough to become lodged in the passage 52 to the orifice 50, the pressure in the passageway 52 will increase. This is because the positive displacement pump 12 operates at a constant rpm to process a constant volume of production water per unit of time. Thus, if the effective orifice area becomes smaller, due to blockage, the pressure in the system will automatically increase to maintain the given volume of production water per unit time. When a blockage of the orifice 50 results in increased fluid pressure in the nozzle 30, the increased pressure of the hot water will push the ceramic plunger 46 downwardly. The downward movement of the ceramic plunger 46 is effective to enlarge the passage 52, thus allowing the particle to pass through to the closest orifice 50. After passage of the particle through the orifice 50, the water pressure within the expansion nozzle 30 returns to its normal operating state, and the ceramic plunger 46 moves upwardly to its normal operating position. While not shown, respective deflection plates (not shown) can be fixed to the outer surface of the expansion nozzle body 34, above each orifice 50, to deflect the high pressure stream of flashed steam downwardly toward the bottom of the expansion tank 18.

The foregoing illustrates the self-cleaning nature of the nozzle with respect to removal of particulate matter that can clog the orifices 50 of the nozzle 30. To that end, the production water processing system 10 can process water with particulate solids therein without causing clogging of the nozzle 30 and the resulting disruption of the system in cleaning the nozzle, which would otherwise be necessary. As noted above, by employing a positive displacement pump 12, the liquid pressure in the system changes to maintain the given flow rate. Thus, the adjustment of the spring 56 to increase the compression pressure thereof results in an increased pressure of the liquid being processed, without changing the flow rate through the nozzle 30. Importantly, when the pressure of the liquid processed in the system 10 is reduced for any reason, the spring 56 causes the nozzle orifices 50 to close to maintain the system at a given pressure. This is important, as when the production water is heated to a high temperature in the coils 14, a minimum liquid pressure must be maintained in order for the water not to flash when heated in such coils 14. The flashing of any liquid in the coils 14 produces a highly corrosive environment which can rapidly deteriorate the coils and severely reduce the life thereof. In one embodiment of the invention, when the production water is heated in the coils 14 to a temperature of about 600 degrees F., and a liquid pressure of about 3,500 psi is maintained by the proper adjustment of the spring 56 in the nozzle 30, the production water remains in the liquid state until released from the nozzle 30, whereupon the near-atmospheric conditions causes the liquid to disperse into many particles and immediately flash into steam.

It should be understood that the spring-operated nozzle 30 is also effective to maintain or regulate the liquid pressure in the upstream part of the processing system as a result of changing densities of the liquid processed by the system. In other words, if the density of the liquid passing through the nozzle 30 decreases, then the constant spring force will cause the orifice area to be reduced to thereby maintain the system at a given pressure. The density of the liquid processed by the system 10 may change as a result of the temperature of the liquid, the type of liquid, such as when the production water includes petroleum products, when the liquid has gas particles therein, etc. Thus, the nozzle 30 is well adapted for reliably processing the production water which generally has particles and many other impurities that would otherwise cause many processing inefficiencies. The other nozzle embodiments described below are constructed to provide the same advantages as the nozzle 30, and additional advantages.

Figure 3:
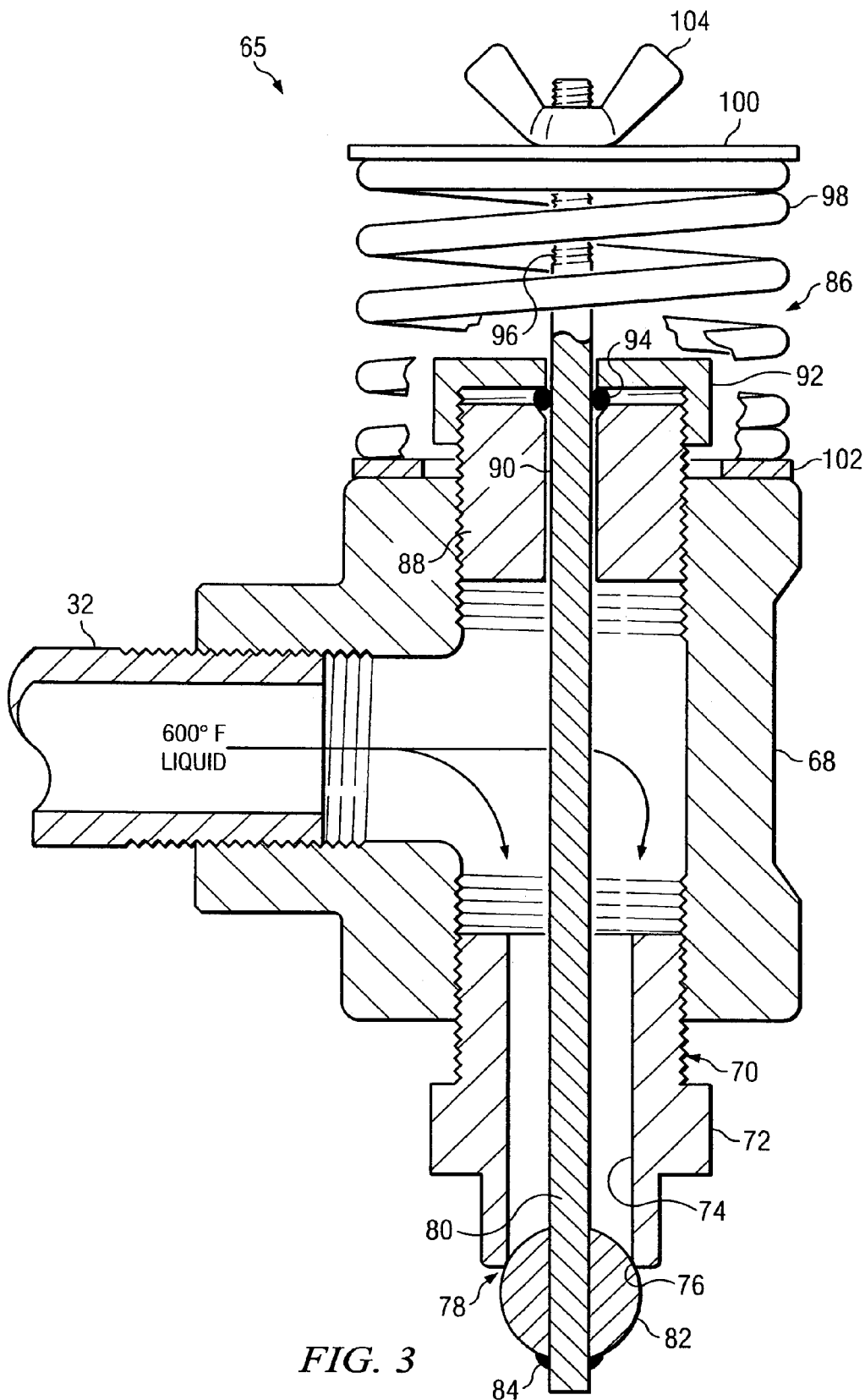
FIG. 3 is another embodiment of an expansion nozzle according to the invention.

FIG. 3 is another embodiment of an expansion nozzle 65 according to the invention. The stainless steel tube 32 carries high pressure, thigh temperature production water to the expansion nozzle 65. The tube 32 is threaded into a stainless steel "T" 68 of conventional design. The nozzle apparatus is situated at the bottom of the T 68, and the adjustment apparatus is situated at the top of the T 68. The nozzle apparatus includes a fitting 70 that is threaded into the bottom opening of the T 68. The threaded fitting 70 is typically a stainless steel fitting welded to a stainless steel pipe to mate the pipe to a threaded hole. The fitting 70 is formed with a hex-shaped wrench collar 72. The fitting 70 includes a bore 74 therethrough that opens to an annular edge or seat 76 that forms an annular orifice 78. The annular edge 76 can be chamfered or beveled, if desired.

The expansion nozzle 65 includes a stem 80 to which is welded a ceramic ball 82. The weld is shown as numeral 84. The ceramic ball 82 is larger than the bore 74 of the fitting 70 and thus circumferentially engages with the annular edge 76 of the fitting 70. When the stem 80 moves downwardly, the ceramic ball 82 move downwardly in a corresponding manner and forms a space or orifice 78 with the annular edge 76 of the fitting 70. The ceramic material of the ball 82 is well adapted for use in the high temperature and high pressure conditions noted above. In practice, the ceramic ball 82 has a bore therethrough through which the end of the stem 80 extends. The lower end of the ceramic ball 82 can thus be welded to the stub end of the stem 80.

The stem 80, and thus the ceramic ball 82, is adjustable by way of an adjustment mechanism 86. The adjustment mechanism 86 includes a stainless steel plug 88 that is threaded into the top of the T 68. The plug 88 is formed with a bore 90 centrally therein and through which the stem 80 extends. An apertured cap 92 is threaded onto the top end of the plug 88. The aperture in the cap 92 allows the stem 80 to extend therethrough. A seal is formed between the plug 88 and the stem 80 using a suitable packing 94 which is squeezed tightly around the stem 80. The packing 94 is squeezed to form the seal by means of the cap 92 being screwed onto the plug 88 sufficiently tight so that the packing 94 forms a seal to prevent the pressurized production water from escaping from the expansion nozzle 65, except through the orifice 78 at the lower end of the nozzle 65.

The top end of the stem 80 has threads 96. A compression spring 98 is captured between a top washer 100 and a bottom washer 102. A thumb screw 104 is threaded onto the top of the stem 80 and rotated to adjust the compression of the spring 98 and thereby apply a preset compression to the spring 98. The constant force produced by the compression of the spring 98 is effective to maintain a constant production water pressure. During static conditions, the upward force on the stem 80 holds the ceramic ball 82 engaged against the annular edge 76 of the fitting 70. In the static condition of the expansion nozzle 65, the orifice area is effectively zero, as the ceramic ball 82 is held against the annular edge 76 of the fitting 70. The spring 98 is constructed of an alloyed steel material to withstand the high temperatures to which the expansion nozzle 65 is subjected. Preferably, the spring 98 is selected to exhibit a linear force over the normal range of compression to provide the desired range of orifice sizes. The preset compression force applied by the spring 98 to the stem 80 can be adjusted to different values by the thumb screw 104.

In operation, the high temperature, high pressure production water is applied to the nozzle 65 by the tubing 32. The pressure of the hot production water, in the neighborhood of 2,000 psi in one preferred embodiment, is sufficient to overcome the force of the spring 98, whereby the stem 80 is forced downwardly against the force of the spring 98. This movement of the stem 80, and thus the ceramic ball 82, is effective to move the ball 82 away from the annular edge 76 of the fitting 70 to thereby form an annular orifice 78. The ceramic ball 82 is moved away from the annular edge 76 of the fitting 70 by a distance such that the force exerted internally in the expansion nozzle 65 by the pressurized production water is equal to the upward force exerted by the spring 98 on the stem 80 and ceramic ball 82. This equilibrium is maintained as long as the pressure of the production water remains the same, which is desired in the preferred embodiment of the invention.

As noted above, the size of the orifice 78 can be manually adjusted by adjustment of the thumbscrew 104. By tightening the thumb screw 104 on the threaded end of the stem 80, the orifice 78 is made smaller, and the pressure of the production water increases to maintain the same flow rate of liquid through the nozzle 65. In contrast, when the thumb screw 104 is loosened on the stem 80, the orifice 78 is effectively made larger, which reduces the system pressure to maintain the same flow rate of liquid through the expansion valve 65. In practice, the size of the orifice 78 is adjusted to provide a desired liquid pressure in the system 10 so that flashing of the liquid in the heating coils 14 is prevented. This condition also achieves optimum flashing of the hot production water into steam. In the embodiment of FIG. 3, the entire expansion valve is inside the expansion chamber 18 and thus the adjustment thereof cannot be accomplished during dynamic operation of the system. Much like the expansion nozzle 30 of FIG. 2, the expansion nozzle 65 of FIG. 3 is self cleaning, in that any particle or other matter that becomes lodged in the orifice effectively reduces the area of the orifice 78 and thereby increases the pressure within the expansion nozzle 65. This operation of the nozzle 65 is also achieved when the orifice areas accumulate residue thereon, or when the orifice surfaces become worn due to extended use. In response to a reduced orifice area, the increased liquid pressure forces the stem 80 downwardly somewhat to again equalize the forces between the internal liquid pressure within the expansion nozzle 65 and the force exerted by the spring 98. The downward movement of the stem 80 increases the orifice size which may be sufficient to allow the particle to pass through the orifice 78. In this event, the stem 80 will move upwardly until the noted forces again reach equilibrium. If the operation of the water purification system indicates that the particle clogging the orifice is not removed automatically in the manner noted, then it is possible to increase the pressure of the production water upwardly to 5,000 psi to break the particle and force the pieces of the particle through the orifice 78.

Figure 4:
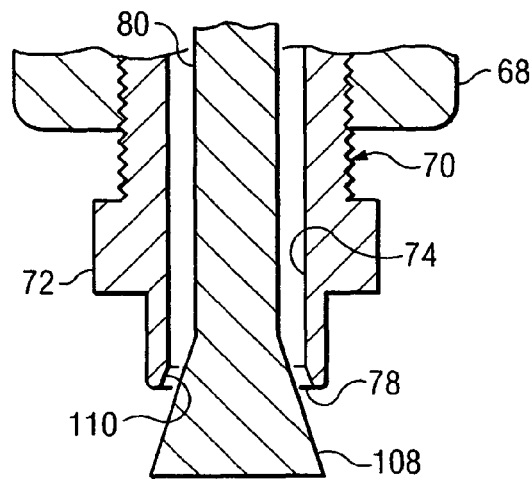
FIG. 4 is an alternate arrangement of a nozzle that can be employed in the expansion nozzle of FIG. 3.

FIG. 4 illustrates another arrangement for defining an orifice 78 in the expansion nozzle 65. Here, instead of employing a ball 82, a tapered ceramic member 108 is welded or otherwise formed on the bottom end of the stem 80. The conical surface of the ceramic member 108 seats with a corresponding tapered annular edge 110 of the fitting 70. The nozzle arrangement otherwise functions in the same manner as that described above in connection with the expansion nozzle 65 of FIG. 3.

Figure 5:
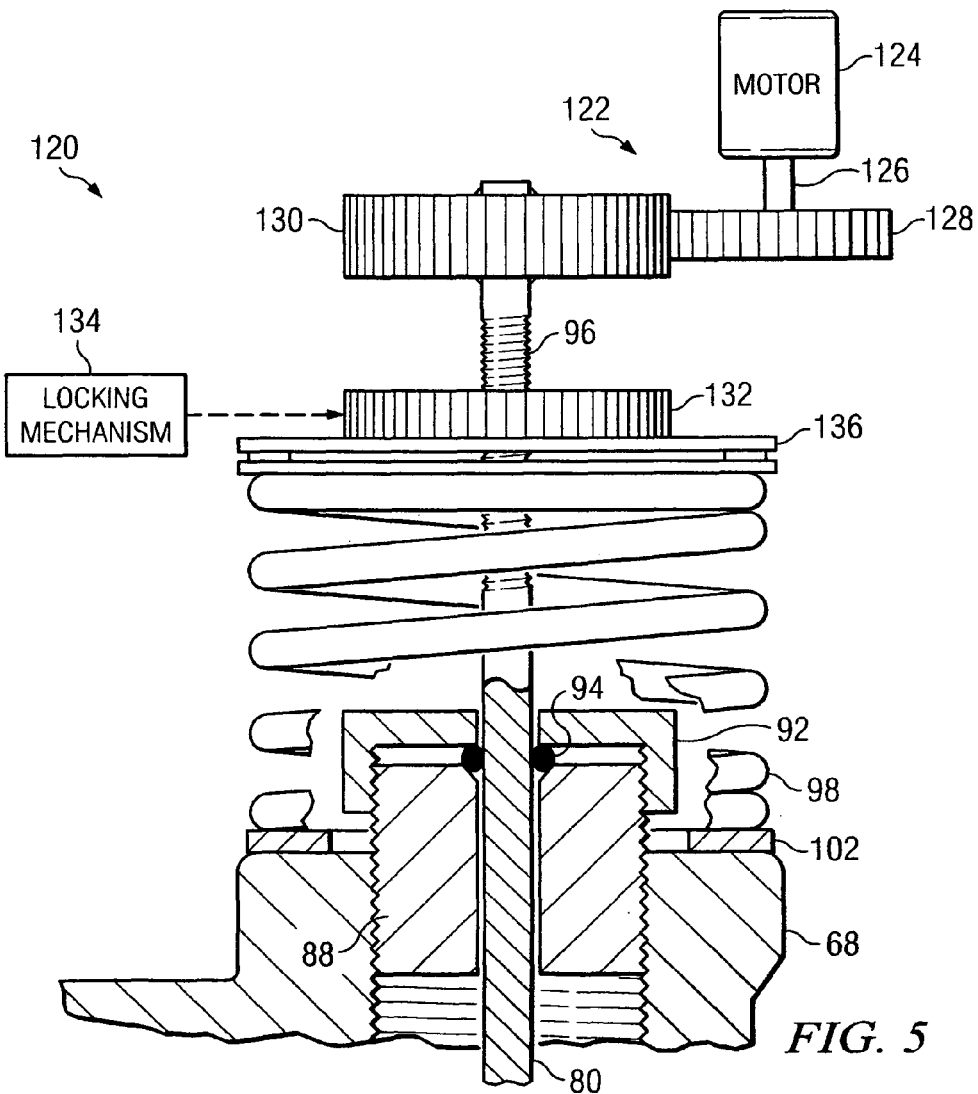
FIG. 5 is an embodiment of an expansion nozzle equipped with mechanized orifice adjustment apparatus.

FIG. 5 illustrates an expansion nozzle 120 equipped with a motorized adjustment mechanism 122. Rather than being manually adjustable, the expansion nozzle 120 is adjusted by energizing a DC motor 124 in one direction to increase the pressure of the production water in the system 10, and in the other direction to decrease the pressure. As noted above, the position of the stem 80 is dynamic during operation of the system 10, to maintain the pressure of the liquid processed therethrough essentially the same, irrespective of changes in temperature, density and composition of the liquid. The DC motor 124 and the associated apparatus described below are suitable for operating in the environment found in the expansion chamber 18. The pressure in the expansion chamber 18 is generally about 50 psi, with a temperature in the neighborhood of about 212-240 degrees F.

The DC motor 124 is equipped with a shaft 126 and a gear 128. The motor gear 128 meshes with another gear 130 which is fixed to the top of the nozzle stem 80. Thus, when the motor 124 is energized, the rotation of the motor gear 128 causes rotation of the stem gear 130. Rotation of the stem 80 by the motor 124 may, or may not, cause adjustment of the compression force of the spring 98, it being understood that when the compression force is increased because of rotation of the stem 80, the pressure of the processed liquid increases. The rotation of the stem 80 is effective to cause adjustment of the compression force of the spring 98 if the internally threaded idler gear 132 is maintained stationary. On the other hand, if the idler gear 132 is allowed to rotate with the stem 80, then there is no axial movement of the stem and the compressive state of the spring 98 remains the same. It is to be noted that the compression state of the spring 98 may automatically change during dynamic operation of the nozzle 120, in response to changes in the parameters of the liquid being processed therethrough. If the pressure of the production water changes for some reason, the stem 80 automatically moves axially as a function of the differential pressure between the spring force and the different liquid pressure. This is allowed by the vertical or axial movement of the stem 80 and the corresponding axial movement of the gear 130 with respect to the motor gear 128, the latter of which remains axially stationary. The relative axial movement between the gear 130 and the motor gear 128 is allowed because such gears are constructed as straight-tooth spur gears.

The expansion nozzle 120 includes a locking mechanism 134 which is effective to lock the idler gear 132 against rotation, or allow the idler gear 132 to rotate with the stem 80. The locking mechanism 134 can be constructed in many different forms, including a solenoid having a plunger that engages with the peripheral teeth of the idler gear 132 to arrest rotation thereof. The idler gear 132 can be coupled to a clutch, either of mechanical or magnetic design, to engage and disengage so as to control the rotation of the idler gear 132. The idler gear 132 rests on a thrust bearing 136 to promote rotation of the idler gear 132 when not locked by the locking mechanism 134.

In accordance with an important feature of the invention, the expansion nozzle 120 is adapted to remove particulate matter, accumulated residue or deposits located in the orifice 78 or on the orifice surfaces. As noted above, the flashing of the high temperature, high pressure production water often produces accumulations of material that adhere to the orifice surfaces. This accumulated matter cannot generally be removed by the opening and closing of the orifice 78 by axial movement of the stem 80. With the arrangement illustrated in FIG. 5, the orifice 78 can be closed by upward movement of the stem 80, or by reducing the pressure of the production water, and then the stem 80 can be rotated to lap the orifice surfaces and remove any residue that has accumulated thereon.

The lapping of the orifice surfaces is carried out in the following manner. First, the stem 80 is moved upwardly so that the ceramic ball 82 is brought into contact with the annular edge 76 of the fitting 70. As noted above, the upward movement of the stem 80 can be occasioned by either reducing or removing the pressure of the production water coupled to the expansion nozzle 65, or by rotating the motor 124 in a specified direction with the idler gear 132 locked. Once the ceramic ball 82 is brought into contact with the annular seat 76, the motor 124 is again energized in either direction, with the idler gear 132 unlocked, so that the stem 80 is rotated without any corresponding axial movement thereof. This action causes the ceramic ball 82 to rotate in contact with the stationary annular seat 76 of the fitting 70, thereby removing any residue on either the ceramic ball 82 or the annular seat 76. After a sufficient number of rotations of the stem 80 has been achieved to clean the orifice surfaces, the expansion nozzle 65 can be returned to operation by activating the locking mechanism 134 and the motor 124 to place the stem 80 at a specified axial location to set the orifice 78 to the desired area, if needed.

Importantly, the production water can be periodically coupled to the expansion nozzle 65 during the lapping operation so that the pressurized water washes the lapped residue away from the orifice surfaces. The advantage of the lapping operation is that the system need only be interrupted briefly without any dismantling of the components thereof. Indeed, those skilled in the art may find that the nozzle lapping operation can be carried out in a manner that is transparent to the operation of the system. In other words, the pressure and temperature of the production water coupled to the expansion nozzle 65 can remain the same during the nozzle lapping operation, and can even be processor controlled so that no human intervention is necessary. In this event, a relief valve (not shown) can be employed during closing of the expansion nozzle orifice 78 to relieve the pressure of the production water for recirculation back to the input of the water purification system. The DC motor 124 and the locking mechanism 134 can be controlled by a programmed processor so that periodically, such as every twenty four hours, the DC motor 124 and the locking mechanism 134 (and any relief valve employed) is controlled to cause automatic lapping of the orifice surfaces and reconstitute the same.

In this and the other embodiments to be described below, it may be desired to control the nozzle 120 during dynamic operation thereof so that the stem 80 continuously rotates, such as at a rate of one rpm, to provide a relative rotational movement between the orifice surfaces 76 and 82. This relative rotational movement between the orifice surfaces 76 and 82 is effective to grind and abrade particles lodged therebetween and cause such particles to pass through the orifice. This function is carried out by rotating the stem 80 while the idler gear 132 is unlocked, so that the compression force of the spring 98 remains unchanged. This feature thus facilitates the self-cleaning function of the nozzles of the invention.

Figure 6:
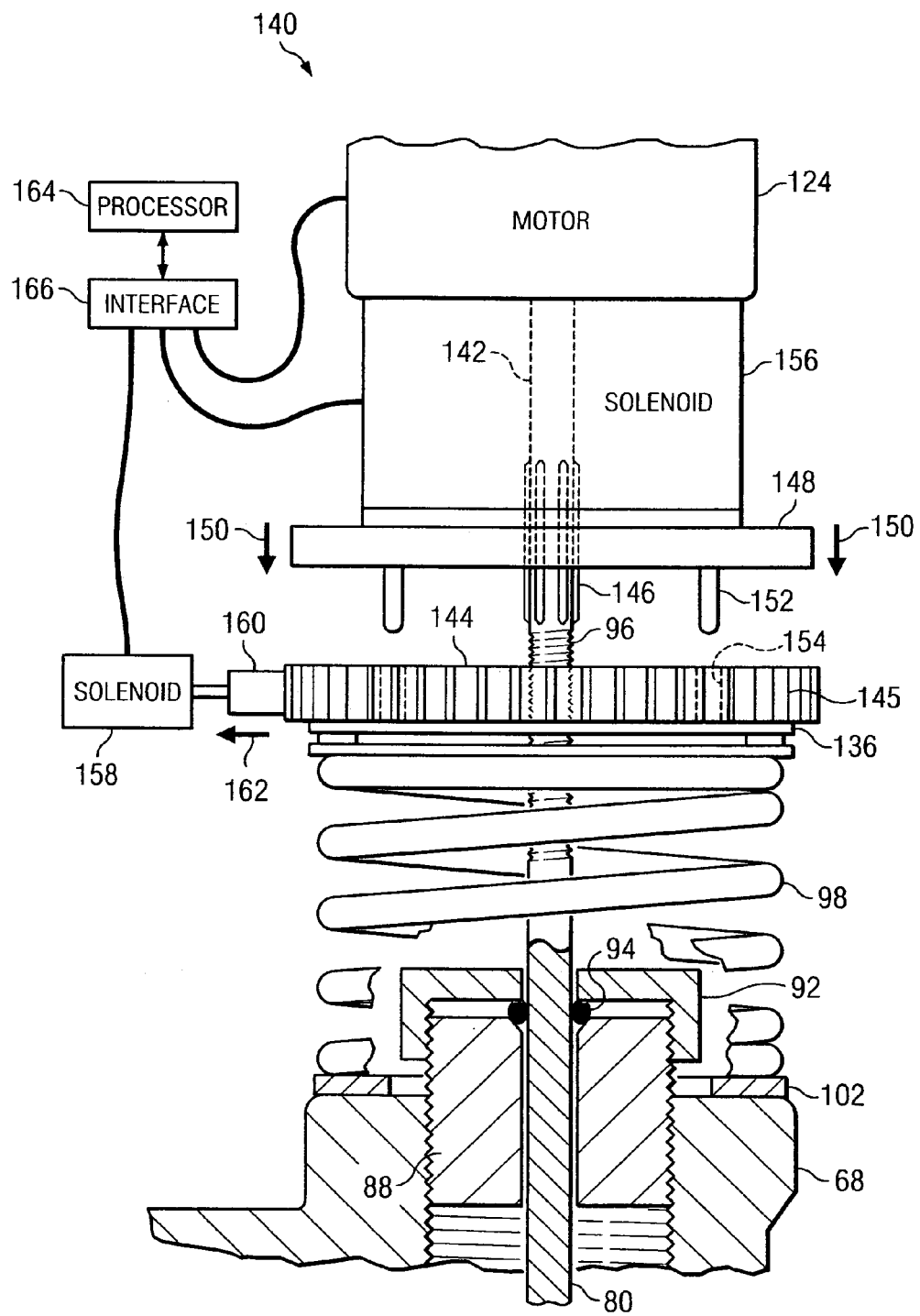
FIG. 6 is an embodiment of the expansion nozzle adjustment mechanism employing a solenoid to lock and unlock the idler gear to allow spring compression adjustments and to allow the nozzle surfaces to be lapped and cleaned.

FIG. 6 illustrates yet another embodiment of an expansion nozzle 140 constructed according to the invention. Here, the DC motor 124 includes a motor shaft 142 that is coupled by suitable means to the top of the stem 80. The coupling is preferably of a telescopic type so that the stem 80 can move axially with respect to the motor shaft 142 during axial movements of the stem 80 to maintain a constant pressure of the production water. The coupling can be male/female splined connection or other suitable telescopic coupling. The top portion of the stem 80 is threaded in the same manner noted above for engagement with the threaded bore of an idler gear 144. In addition, the motor shaft 142 is splined 146 for axial movement thereon of a mechanical clutch plate 148. The clutch plate 148 moves in the direction of arrows 150 for engagement with the idler gear 144. Formed on the bottom of the clutch plate 148 are one or more pins 152 that engage with respective holes 154 formed in the idler gear 144 as the clutch plate 148 is lowered. A solenoid 156 is fastened to the motor 124 and includes a cylindrical plunger (not shown) that is attached to the clutch plate 148. When not energized, the cylindrical plunger is withdrawn into the body of the solenoid 156 by a spring (not shown) so that the pins 152 of the clutch plate 148 are withdrawn from the holes 154 in the idler gear 144. As noted above, when the solenoid 156 is energized, the clutch plate 148 is forced downwardly in the figure, whereupon the pins 152 become engaged within the holes 154 of the idler gear 144.

A second solenoid 158 is provided to lock the idler gear 144 against rotation. The solenoid 158 includes a plunger to which a toothed block 160 is fastened. The teeth of the block 160 engage with the peripheral teeth 145 of the idler gear 144 and prevent rotation of the idler gear 144. When not activated, the plunger of the solenoid 158 is extended so that the toothed block 160 engages the idler gear 144 to prevent rotation thereof. When energized, the plunger of the solenoid 158 is withdrawn in the direction of arrow 162 so that the idler gear 144 is free to rotate.

The DC motor 124 and the solenoids 156 and 158 are controlled by a programmed processor 164. The processor 164 provides signals to an interface 166 to provide the appropriate electrical drive signals to the electrical equipment of the water purification system, including the expansion nozzle 140. While not shown, the top portion of the expansion nozzle 140 can be covered and sealed with an enclosure cap, not shown. The enclosure prevents the various liquids and particulate matter within the expansion chamber 18 from clogging and otherwise disturbing operation of the electromechanical equipment of the expansion nozzle 140. A lubricating oil can be injected within the sealed enclosure of the expansion nozzle 140 to maintain the various mechanical components thereof lubricated.

In operation of the expansion nozzle 140, when it is desired to axially adjust the stem 80 and adjust the static compression force of the spring 98, the solenoids 156 and 158 are not energized. In other words, the clutch plate 148 remains in its upward position, and the toothed block 160 remains engaged with the idler gear 144 to prevent rotation thereof. The motor 124 is then energized to rotate the motor shaft 142 which, in turn, rotates the stem 80. Since the stem 80 is threadably engaged with the idler gear 144 (which remains stationary), the stem 80 moves up or down depending on the direction of rotation of the motor shaft 142. The rotation of the stem 80 effectively compresses the spring 98 more, or reduces the compression of the spring 98. The degree of compression of the spring 98 relates to the degree that the ceramic ball 82 moves away from the seat 76, as a function of the pressure of the production water coupled to the expansion nozzle 140. As can be appreciated, physical access to the expansion nozzle is not necessary. Rather, the processor 164 causes the electrical signals to be coupled to the electrical apparatus to control the same. It should be noted that the water purification system 10 includes a manual control panel (not shown) so that an operator can place the processor 164 in a manual mode and manually control the various processes of the system 10, including the motors and solenoids of the expansion nozzle 140.

When it is desired to lap the orifice surfaces to remove any residue or deposits therefrom as a result of the flash expansion of the high pressure, high temperature production water, then the processor 164 can automatically control the electrical apparatus in the following manner. The solenoid 156 is energized so that the clutch plate 148 is forced downwardly in the direction of arrows 150. The pins 152 thus bear against the top surface of the idler gear 144, and then eventually drop into the holes 154. The solenoid 158 is energized so that the toothed block 160 is withdrawn in the direction of arrow 162. The idler gear 144 is thus free to rotate. The DC motor 124 is then energized to rotate the shaft 142, which also rotates the stem 80. Since the clutch plate 148 is splined 146 to the motor shaft 142, the clutch plate 148 rotates with the motor shaft 142. If the pins 152 did not previously lodge within the holes 154 of the idler gear 144, the initial relative rotation between the clutch plate 148 and the idler gear 144 will eventually cause engagement between the pins 152 and the holes 154. When engaged, the idler gear 144 is driven by the clutch plate 148 via the pins 152. Thus, the stem 80 rotates without any axial movement thereof. With the pressure of the production water relieved, the spring 98 will cause the ceramic ball 82 to engage the seat 76 of the fitting 70. The direct contact therebetween and with the rotation of the ceramic ball 82, any deposits or residue accumulated on the orifice surfaces will be removed. The spring 98 will maintain a pressure between ceramic ball 82 and the annular seat 76.

Indeed, the electrical apparatus of the expansion nozzle 140 can be controlled before the lapping process begins to assure that the spring 98 is sufficiently compressed to increase the lapping pressure to remove hardened residue on the orifice surfaces. Once the lapping process is completed, the expansion nozzle 140 can be returned to service by removing the energization of the solenoids 156 and 158, and returning the spring tension back to the desired compression force. The exact position of the motor shaft 142 can be more accurately controlled by using a stepper motor, and pulsing the motor with pulses generated by the processor 164. In other words, when the spring compression force is initially determined to achieve the desired orifice spacing as a function of the pressure of the production water, then any rotational movements thereafter can be noted so that it is easy to return the force of the compressed spring to its original and desired state. Alternatively, the compression force of the spring 98 can be adjusted by noting the pressure at the output of the high pressure pump 12, and adjusting the spring 98 until the desired system pressure is achieved.

Figure 7:
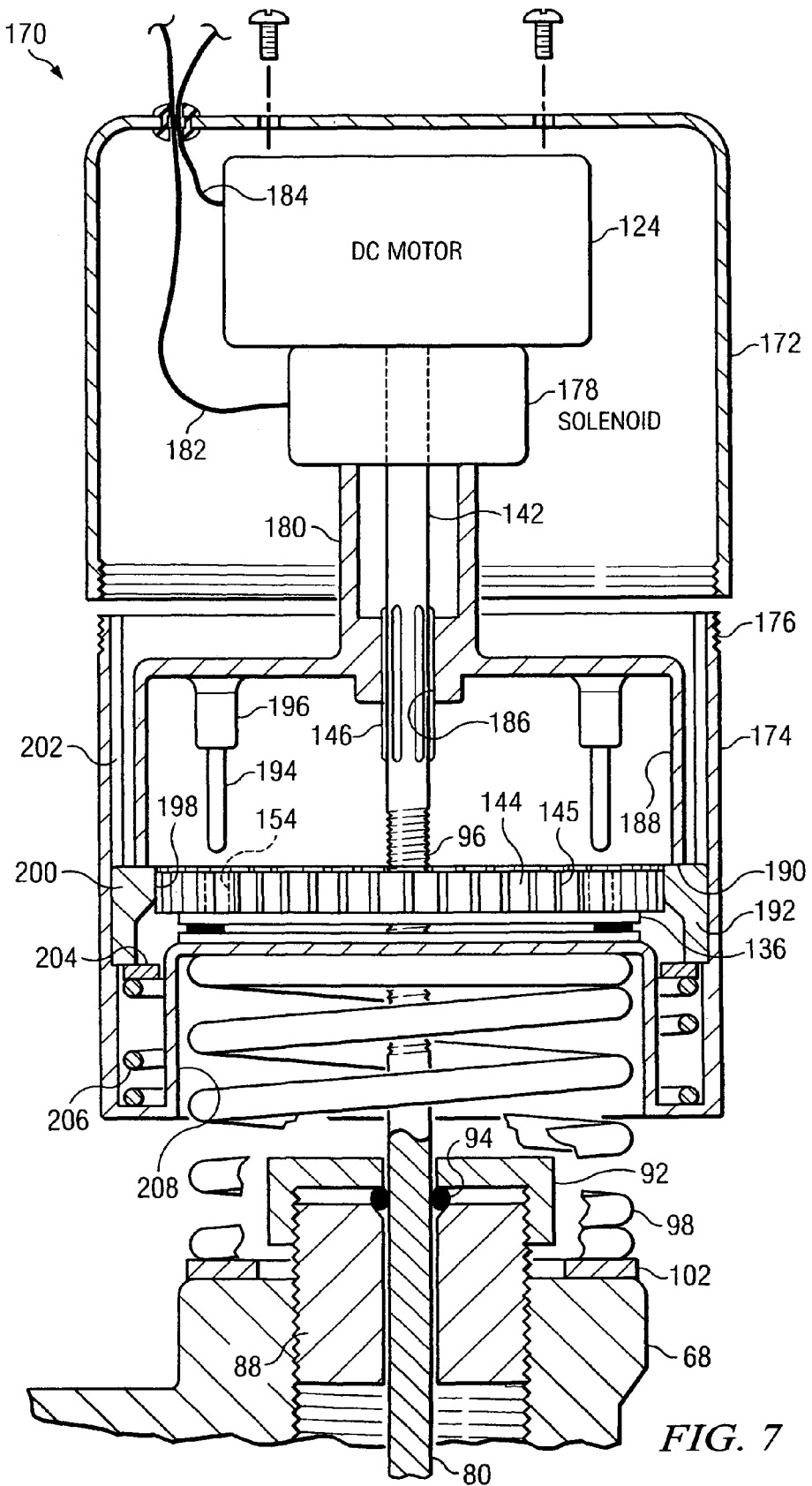
FIG. 7 is an embodiment of the expansion nozzle illustrating another adjustment mechanism for adjusting the spring compression and for lapping the nozzle surfaces, where the idler gear is shown locked.

FIG. 7 illustrates another embodiment of an expansion nozzle 170 constructed according to the invention. The nozzle adjustment mechanism is shown enclosed to protect the components from the harsh environment inside the expansion chamber 18. A container top 172 is threadably fastened to a container bottom 174 by way of threads 176. The container bottom 174 is attached to the compression spring 98 in the manner described below. If desired, the container top 172 and bottom 174 can be sealed so that a lubricating oil can be placed therein. In this embodiment, only a single solenoid 178 is employed to both unlock the idler gear 144, and to engage the idler gear 144 and cause rotation of the same during lapping of the nozzle surfaces.

The solenoid 178 is preferably fastened to the DC motor 124 so that the motor shaft 142 extends through the solenoid 178. The motor shaft 142 is fastened to the stem 80 by any suitable telescopic coupling means. The motor shaft includes splines 146. The solenoid 178 includes a cylindrical plunger 180 that moves axially in response to electrical actuation of a coil (not shown). The solenoid 178 is preferably of the type that includes an internal spring that maintains the plunger 180 withdrawn in the core of the solenoid body when the coil is not electrically energized. The solenoid wires 182 and the wires 184 of the DC motor 124 exit the top of the container top 172 via a grommet or other means to seal the electrical conductors to the container top 172. The solenoid plunger 180 includes an internally splined bore mating with the splines 146 of the motor shaft 142. Thus, the solenoid plunger 180 rotates when the motor shaft 142 rotates. The bottom portion of the solenoid plunger 180 includes a cylindrical plunger envelope 188 having a bottom annular edge 190 that engages with the top annular edge of a cylindrical-shaped idler gear lock ring 192. As will be described below, the downward movement of the solenoid plunger envelope 188 causes the spring-biased idler gear lock ring 192 to move downwardly and unlock the idler gear 144 and allow rotational movement thereof. While not shown, a thrust bearing can be used between the bottom edge 190 of the solenoid plunger envelope 188 and the top of the idler gear lock ring 192 to allow easy relative rotation therebetween. The solenoid plunger envelope 188 has attached thereto a number of spring-loaded pins 194 that depend downwardly, as shown. The pins 194 can be forced at least partially into respective spring housings 196 in the event they are not initially aligned with the respective holes 154 in the idler gear 144.

When the solenoid 178 is electrically energized, the plunger 180 is forced downwardly, which causes two corresponding actions to occur simultaneously. First, the downward movement of the solenoid plunger 180 moves the solenoid plunger envelope 188 downwardly also. This downward movement causes the pins 194 to engage within the holes 154 of the idler gear 144. The downward movement of the solenoid plunger envelope 188 also causes the downward movement of the idler gear lock ring 192. The inner annular surface of the idler gear lock ring 192 includes gear teeth 198 that mesh with the gear teeth 145 around the circumference of the idler gear 144. Moreover, the idler gear lock ring 192 is axially movable up and down by means of a number of ridges or keys thereon that engage within respective vertical slots 202 formed in the inner sidewall of the container bottom 174. In this manner, the idler gear lock ring 192 can move axially in a vertical direction but is prevented from rotating.

The bottom annular edge of the idler gear lock ring 192 rests on a washer 204 which, in turn, rests on the top of a spring 206. The washer 204 and the spring 206 are nestled in a annular-shaped portion of the container bottom 174. The bottom of the container bottom 174 is cup-shaped inwardly to allow the nozzle compression spring 98 to protrude therein so that the container bottom 174 rests thereon. The cupped portion of the container bottom 174 is shown by reference numeral 208. The idler gear 144 rests on a thrust bearing 136 which, in turn, rests on the top of the cupped portion 208 of the container bottom 174. As noted above, the central bore of the idler gear 144 is threadably engaged with the threaded part 96 of the nozzle stem 80 so that rotation of the stem 80 in one direction is effective to move the idler gear 144 downwardly to increase the static compression force of the nozzle spring 98. Rotation of the stem 80 in the other direction by the DC motor 124 is effective to move the idler gear 144 upwardly and reduce the static compression force exerted by the spring 98.

In operation, when it is desired to increase the compression force of the nozzle spring 98, all that is necessary is to energize the DC motor 124 so that the motor shaft 142, and thus the stem 80, moves in a direction such that the idler gear 144 moves axially downwardly (without rotating) and compresses the nozzle spring 98. This effectively reduces the flow rate of the production water through the orifice 78. In the event it is desired to reduce the compression force of the nozzle spring 98, the DC motor 124 is simply energized to rotate the motor shaft 142 in the opposite direction. The DC motor 124 is reversed by controlling the computer interface 166 (FIG. 6) to reverse the DC current through the DC motor 124.

Figure 8:
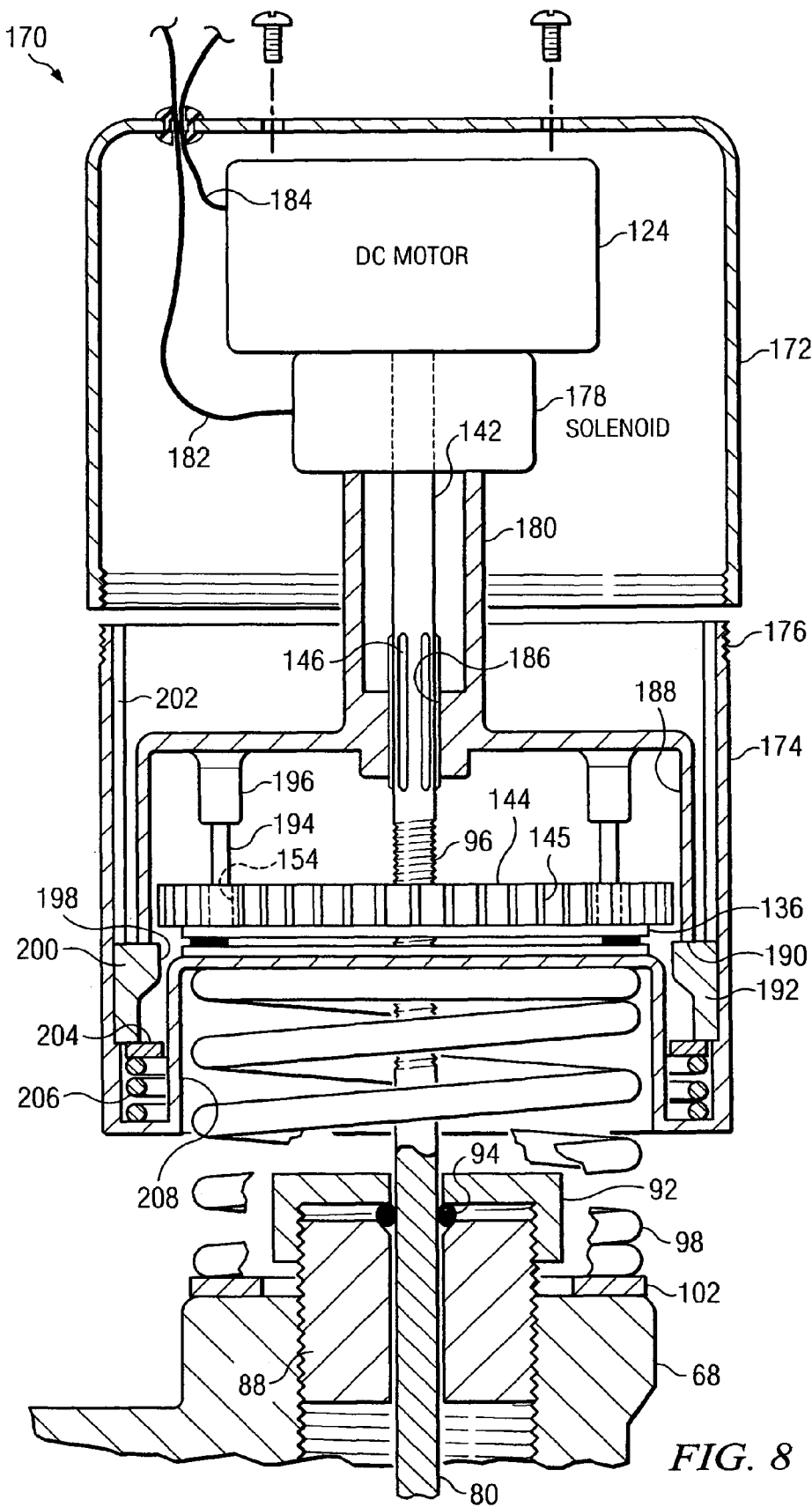
FIG. 8 illustrates the expansion nozzle of FIG. 7, with the idler gear unlocked so that the nozzle surfaces can be lapped without disturbing the compression of the spring.

The state of the expansion nozzle 170 during the nozzle lapping process is shown in FIG. 8. Initially, it is preferred that the pressure of the production water be reduced so that the orifice 78 between the ceramic ball 82 and the annular seat 76 closes. When it is desired to lap the nozzle surfaces, which include that part of the ceramic ball surface that engages the annular seat 76, then the solenoid 178 is energized first, and then the DC motor 124 is energized. When the solenoid 178 is energized, the solenoid plunger 180 is forced downwardly so that the pins 194 either engage within the respective holes 154 of the idler gear, or the pins 194 engage the top of the idler gear 144. The downward movement of the solenoid plunger 180 also causes the solenoid plunger envelope 188 to push the idler gear lock ring 192 downwardly out of engagement with the idler gear 144. When unlocked, the idler gear 144 is free to rotate. The DC motor 124 is then energized, in either direction, so that the motor shaft 142 and the nozzle stem 80 rotate. The rotation of the motor shaft 142 causes corresponding rotation of the solenoid plunger 180. The rotation of the solenoid plunger 180 causes the pins 194 to engage within the respective holes 154 of the idler gear 144 if they were not already engaged therein. Once the pins 194 are engaged with the idler gear 144, the idler gear 144 rotates in unison with the DC motor shaft 142. Thus, during the lapping process, the compression of the nozzle compression spring 98 does not change. The solenoid 178 and the DC motor 124 can continue to be energized to cause rotation of the ceramic ball 82 against the seat 76 and remove any residue therebetween. Once the orifice surfaces have been cleaned, the solenoid 178 and the DC motor 124 can be de-energized so that the water purification process can resume.

During the processing of the production water by the system 10, the expansion nozzle 20 can be changed to accommodate various situations. For example, if a particle is determined to be lodged in the orifice 78 of the expansion nozzle 20, then in order to remove the particle, the nozzle 20 can be momentarily closed in order to crush the particle between the ceramic ball 82 and the seat 76. As an alternative, or in addition thereto, the stem 80 can be rotated by the motor 124 in an attempt to grind and pulverize the particle lodged in the orifice. Indeed, during normal operations of the water purification system 10, the plunger rod 80 of the nozzle 20 can be rotated to prevent lodging of particles in the orifice 78. When the seat 76 of the nozzle 20 remains stationary and the stem 80 rotates, any particles lodged in the orifice 78 tend to be abraded or worn down by the movement of the ceramic ball 82. In order to enhance the pulverizing of particulate matter lodged in the orifice 78, one or both orifice surfaces can be roughened, by fine serrations, a grit adhered to the orifice surfaces, or other suitable roughening means. The high pressure of the production water flowing through the orifice tends to further force the particle in the orifice, thereby facilitating the abrading and removal of the particle through the orifice.

Figure 9:
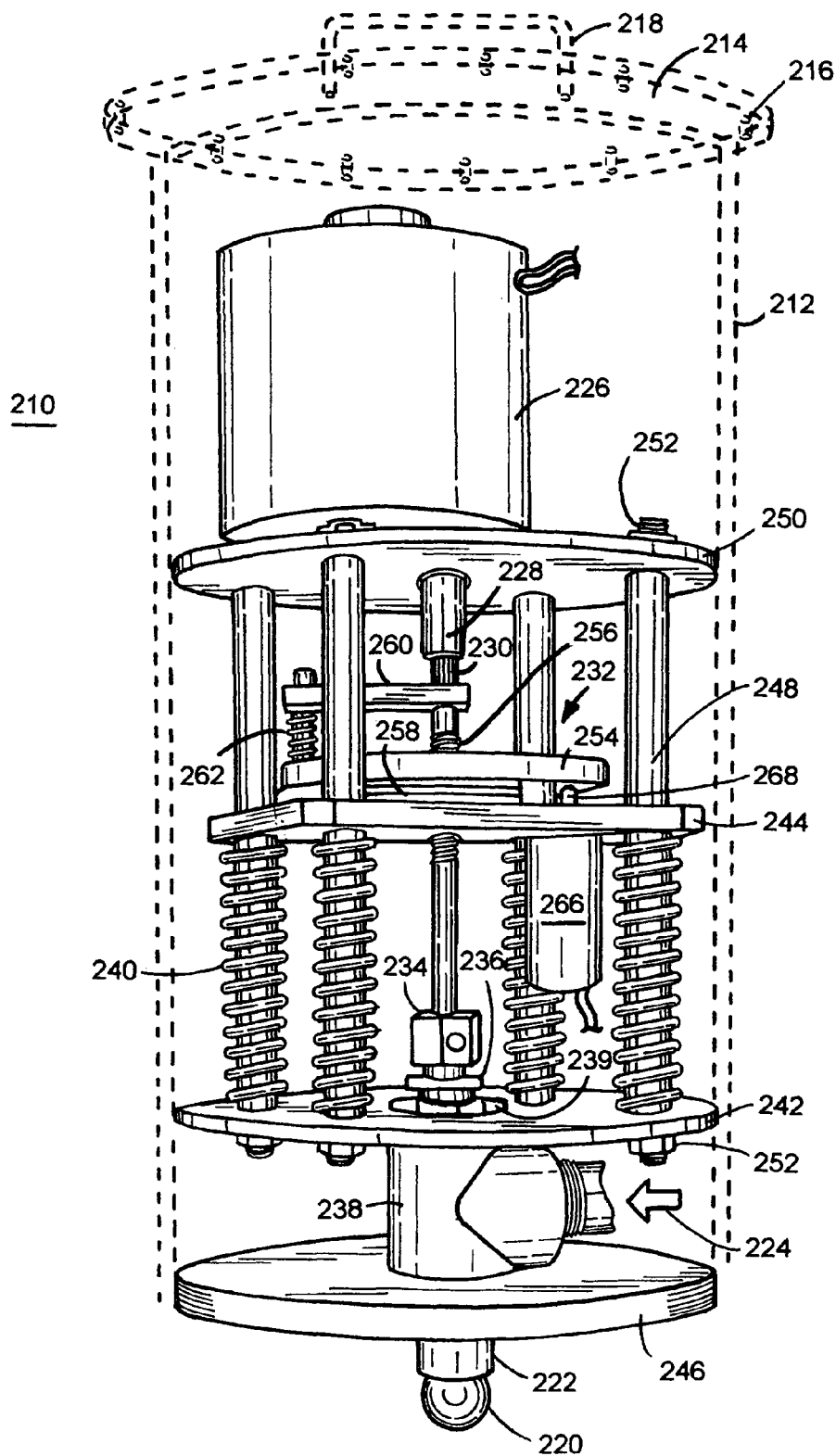
FIG. 9 is a side view of a nozzle assembly constructed according to another embodiment of the invention.

FIG. 9 illustrates another embodiment of a nozzle assembly 210 constructed according to the features of the invention. The nozzle assembly 210 is well adapted for use with water purification systems of the type utilizing flash evaporation techniques. A feature of the nozzle assembly 210 is that it is self-cleaning so that residue on the nozzle orifice surfaces can be periodically removed. The various nozzles of the invention can process solids and particulate matter carried by the liquid, where the solids may be larger in size than the size of the orifice. Moreover, the nozzle can process the high total dissolved solids of hydrocarbon production water greater than 200,000 parts-per-million (ppm), it being realized that sea water generally includes total dissolved solids up to about 30,000 ppm. As will be described below, the nozzle assembly 210 is contained within a housing 212 so that if removal is required, the entire nozzle assembly 210 can be quickly removed and replaced with another nozzle assembly. The housing 212 includes a cylindrical wall formed integral with a top 214 having bolt holes 216. The bottom 246 of the housing 212 is formed with internal left-hand threads at the bottom end for fastening to the external threads formed on the nozzle platform 246. The nozzle assembly 210 can be lowered or otherwise inserted as a unit into a flash chamber so that the housing top 214 can be bolted via holes 216 to the flash chamber. It should be understood that the high pressure nozzle 210 can be employed in applications other than flash evaporation apparatus, as described below.

The nozzle assembly 210 includes an orifice defined by the distance between a ceramic nozzle head 220 and a cylindrical member 222 having a seat (not shown) against which the ceramic nozzle head 20 rests when the orifice is closed. According to a feature of the invention, the nozzle head 220 continuously rotates with respect to the cylindrical member 222 so that any particulate residue can be ground, eroded or otherwise reduced in size during rotation of the nozzle head 220 and forced out of the orifice. It can be appreciated that while the nozzle head 220 rotates with respect to the seat of the cylindrical member 222, the high pressure liquid entering the nozzle, as shown by the arrow 224, forces any particulate matter into the orifice and the movement of the nozzle head 220 tends to erode the particle and reduce the size thereof until the remaining particle is ejected out of the annular orifice. As will be described in more detail below, any residue buildup on the orifice surfaces can be removed by a lapping action in which the nozzle head 220 is placed into contact with the seat of the cylindrical member 222 to remove the residue on the surfaces thereof. It can be appreciated that during the flash evaporation operation, many ionic and other materials can be formed on the orifice surfaces of the nozzle assembly 210 and would otherwise require periodic maintenance. In the flash environment, many of the undissolved solids can return to the solid form and form deposits on the surfaces of the nozzle. This is especially the case where the production water of gas, oil and other wells has many different chemicals therein that create nuisance deposits during the flash evaporation process.

As with the other nozzle assemblies described above, the nozzle assembly 210 is constructed so that the orifice size or area is a function of the pressure of the liquid being flashed by the nozzle into the flash evaporation chamber. Stated another way, if the pressure of the hot liquid passing through the nozzle assembly 210 is reduced for any reason, the orifice size is correspondingly reduced in order to maintain the upstream pressure of the hot liquid at a relatively constant pressure. Conversely, if the upstream pressure of the hot liquid increases, the orifice size increases in a corresponding manner to again maintain the upstream pressure relatively constant. The fluctuations in upstream pressure can be a result of fluctuations in pump pressure, the temperature of the liquid, the density of the liquid, and other reasons. It should be noted that if for some reason the temperature of the production liquid being processed changes, the corresponding density of the liquid can change by as much as a factor of 100. By maintaining a relatively constant upstream pressure on the liquid being processed through the nozzle assembly 210, it is less likely that a pressure drop will cause premature flashing in the upstream heating coils 14 shown in FIG. 1.

The nozzle assembly 210 includes a reversible electric motor 226 equipped with a gear reduction mechanism so that the output shaft 228 rotates at a relatively slow speed, such as 20-30 rpm. The motor 226 and all of the components of the nozzle assembly 210 are selected for reliable operation at temperatures experienced in flash evaporation chambers, such as temperatures around 212° F. The motor shaft 228 has internal splines at the end thereof for engagement with an outer splined nozzle shaft 230. The nozzle shaft 230 is connected to the nozzle head 220, and thus during upward or downward movement of the nozzle shaft 230, such shaft 230 remains drivingly connected to the motor shaft 228. The nozzle shaft 230 can move up or down as a result of dynamic changes in the pressure of the liquid being processed, or can be moved on command by a controller 164 of the water purification system to either adjust the dynamic size of the orifice, or to lap the surfaces of the orifice.

The nozzle shaft 230 is connected to a nozzle orifice adjustment mechanism 232, and extends downwardly through an optional oil extraction collar 234, a seal 236, through a high pressure liquid connection 238, the tubular seat member 222, and then to the nozzle head 220. It should be understood that the utilization of a ball 220 as part of the nozzle is not a necessity, as other shaped nozzle devices can be employed, such as cones and the like. As noted above, the high pressure liquid enters the high pressure connection 238 and then sprays out of the nozzle orifice as numerous miniature droplets. The high pressure connection 238 is connected with other piping (not shown) to the housing 212, and preferably to a nipple attached to the housing top 214. In an application to be described below, the nozzle assembly 210 can be utilized in a separation tank where the oils and water are separated such that the oils rise to the top of the water. The oil can be removed via the nozzle assembly 210 and out of the oil extraction outlet 234. A tubular conduit (not shown) extends from the oil extraction outlet 234 to the top 214 of the housing 212 for removing the oil from the system.

In order to ascertain the integrity of the seal 239, a moisture sensor (not shown) can be mounted to the top of the stationary spring plate 242. If the seal 239 becomes worn and liquid leaks therethrough and onto the stationary spring plate 242, the moisture sensor will detect the same. The electrical output of the moisture sensor can be monitored by the system processor, or a processor mounted in the nozzle assembly 210, so that the problem can be reported and corrective action taken. Such corrective action can be the activation of a bilge pump (not shown) located in the nozzle assembly 210, which can pump liquids accumulated in the bottom of the nozzle assembly to an external waste tank. The exit tube of the bilge pump can be routed through the top lid 214 of the nozzle assembly 210. The bilge pump can be mounted internally in the nozzle assembly 210 and controlled by the nozzle processor.

The nozzle head 220 is spring biased to a position in which the orifice is closed by one or more springs, four of which are shown in the embodiment of FIG. 9. One of the four springs is identified as numeral 240. Each of the four springs 240 is constrained between a bottom stationary spring plate 242 and top movable spring plate 244. The bottom stationary spring plate 242 is fastened to the high pressure connection 238 with a nut 239. The bottom of the high pressure connection 238 is fixed to the outer threaded nozzle platform 246. Four elongate rods, one shown as numeral 248, are threaded at both ends and are fastened between the bottom stationary spring plate 242 and a motor mount plate 250. The top and bottom ends of the bolts 248 are shouldered for fastening to the respective bottom stationary spring plate 242 and the motor mount plate 250 with nuts 252 fastened to the threaded ends. The top movable spring plate 244 has four corner holes through which the respective rods 248 freely extend. Thus, as the top movable spring plate 244 is forced downwardly, as guided by the rods 248, the springs 240 are compressed, and vice versa. The nozzle shaft 230 extends freely through a hole in the middle of the top movable spring plate 244.

As noted above, the nozzle head 220 is continually rotated by the motor 226 during dynamic operation of the flash evaporation process. An orifice adjustment mechanism is employed so that not only can the nozzle head 220 continue to rotate, but the orifice size of the nozzle can also be adjusted by rotating a rotating nut 254 with respect to the nozzle shaft 230. When the top movable spring plate 244 is moved downwardly, the springs 240 are compressed, and the annular nozzle opening is smaller for a given liquid pressure. Conversely, as the top movable spring plate 244 is moved upwardly, the spring tension is reduced, and thus the annular nozzle opening is larger for a give liquid pressure.

The round rotating nut 254 has a central threaded bore mated to a threaded portion 256 of the nozzle shaft 230. The rotating nut 254 rests on a thrust bearing 258 which, in turn, is fastened to the top of the top movable spring plate 244. Thus, as the rotating nut 254 moves downwardly on the threaded portion 256 of the nozzle shaft 230, the top movable spring plate 244 moves down and the springs 240 are compressed. It should be understood that the rotating nut 254 only moves the top movable spring plate 244 when the rotating nut 254 is held stationary while the nozzle shaft 230 continues to turn. As noted above, the motor 226 is reversible so that the nozzle shaft 230 can be rotated either clockwise or counterclockwise to thereby cause the rotating nut 254, when held stationary, to move either up or down on the threaded portion of the nozzle shaft 230.

Figure 10:
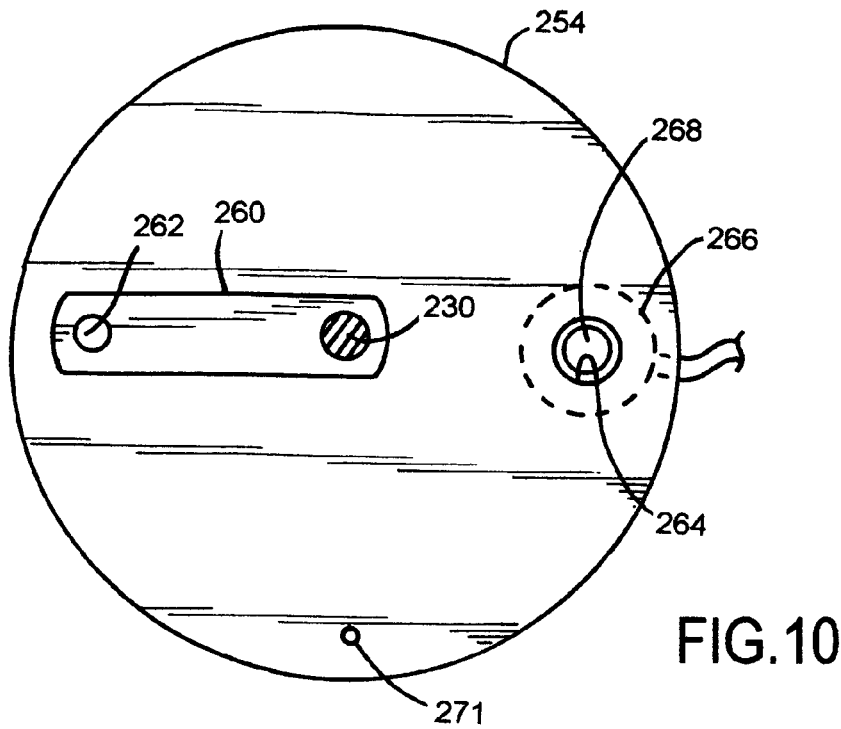
FIG. 10 is a top view of the rotating nut illustrating the swing arm carried with it.

The rotating nut 254 is controlled as to whether it is held stationary or made to rotate with the nozzle shaft 230 by a catch mechanism which includes a swing arm 260 that is fastened to the nozzle shaft 230. The swing arm 260 thus extends radially outwardly from the nozzle shaft 230 and swings in a complete arc as the nozzle shaft 230 rotates. Attached at the end of the swing arm 260 is a spring-loaded plunger 262. The spring bias on the plunger 262 causes the end of the plunger 262 to bear down against the top surface of the rotating nut 254. The rotating nut 254 includes a hole 264 into which the spring-loaded plunger 262 of the swing arm 260 can engage from the top. This is shown more clearly in the top view of the rotating nut 254 of FIG. 10. The thrust bearing 258 is not shown in FIGS. 10-12. In addition, fastened to the bottom of the top movable spring plate 244 is a solenoid 266 which has a shouldered plunger 268 that can also engage the hole 264, but from the bottom of the rotating nut 254. When the solenoid 266 is electrically actuated, the solenoid plunger 268 is extended upwardly. As the solenoid plunger 268 becomes aligned with the hole 264, the solenoid plunger engages therein. This engagement between the solenoid plunger 268 and the rotating nut 254 causes the rotation of the rotating nut 254 to stop. Importantly, even if the spring-loaded plunger 262 of the swing arm 260 is then engaged in the hole 264, the solenoid plunger 268 will displace it and stop rotation of the rotating nut 254.

The hole 264 in the rotating nut 254 is aligned with the solenoid plunger 268 using a small magnet 271 mounted to the underside of the rotating nut 254, and a Hall effect sensor 273 mounted to the top movable spring plate 244. The magnet 271 is mounted about ninety degrees from the hole 264 in which the solenoid plunger 268 engages. The Hall effect sensor 273 is located on the top movable spring plate 244 at a position such that when the magnetic field of the magnet 271 is sensed, the hole 264 is just over the end of the solenoid plunger 268. When it is desired to engage the solenoid plunger 268 in the hole 264 of the rotating nut 254, the nozzle processor uses the electrical output of the Hall effect sensor 273 to sense the presence of the magnet 271. This is an indication that the hole 264 in the rotating nut 254 is aligned with the end of the solenoid plunger 268. The nozzle processor then activates the solenoid 266 to thereby extend the plunger 268 into the hole 264 of the rotating nut 254. The spring-loaded plunger 262 is then displaced from the hole 264 in the rotating nut 254. Next, the nozzle processor causes the motor 226 to rotate the nozzle shaft 230 (and thus the rotating nut 254) one direction and then the opposite direction to assure that the end of the solenoid plunger 268 is fully engaged within hole 264 of the rotating nut 254. During dynamic operation of the nozzle assembly 210, the nozzle processor monitors the electrical output of the Hall effect sensor 273 to verify that the nozzle shaft 230 and thus the rotating nut 254 are indeed rotating. Also, the electrical output of the Hall effect sensor 273 is used to measure the rpm by which the nozzle head 220 rotates with respect to the cylindrical member 222.

Figure 11:
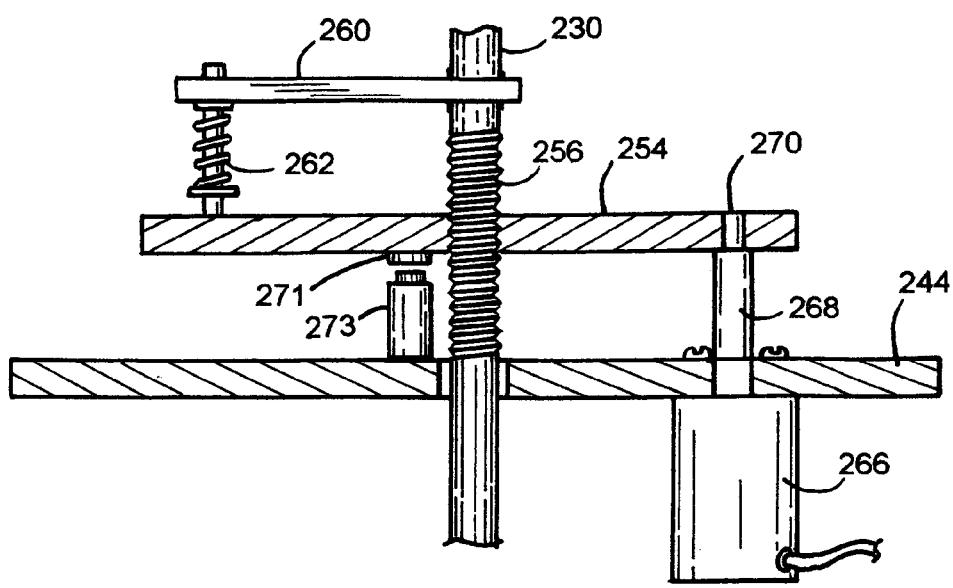
FIG. 11 is a side view illustrating the catch mechanism for holding the rotating nut stationary during adjustment of the nozzle orifice.

Once the controller 164 of the water purification system sends a command to the high pressure nozzle 210 to cause adjustment of the size of the orifice, the solenoid 266 is energized to stop rotation of the rotating nut 254. The state of the solenoid plunger 268 is shown in FIG. 11 during adjustment of the orifice size of the nozzle. Importantly, the end 270 of the solenoid plunger 268 is even with the top planar surface of the rotating nut 254, due to the shouldered construction of the end of the solenoid plunger 268. The solenoid plunger 268 effectively fills the hole 264 of the stopped rotating nut 254, and as the swing arm 260 continues to rotate with the nozzle shaft 230, the bottom end of the spring-loaded plunger 262 rides over the top surface of the stopped rotating nut 254, as well as over the end 270 of the solenoid plunger 268. Depending on the direction of rotation of the nozzle shaft 230, the stopped rotating nut 254 will move up or down on the threaded portion 256 of the nozzle shaft 230. As a result of the relative rotational movement of the nozzle shaft 230 with respect to the stopped rotating nut 254, the springs 240 will be compressed more, or compressed less. The downward movement of the rotating nut 254 on the rotating nozzle shaft 230 will cause the top movable spring plate 244 to move down and compress the springs 240. Conversely, upward movement of the rotating nut 254 will allow upward movement of the top movable spring plate 244 and reduce the compression of the springs 240.

Figure 12:
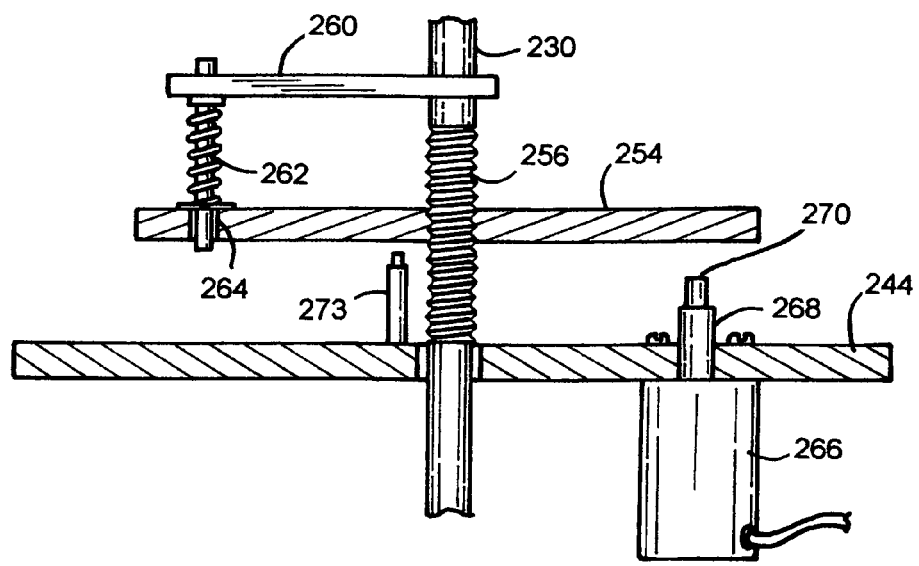
FIG. 12 is a side view of the rotating nut and the swing arm where the solenoid plunger is disengaged from the rotating nut to allow the swing arm to engage the rotating nut and for rotation in unison.

When the nozzle orifice has been adjusted to the desired size, as determined by the upstream liquid pressure, also measured by the system controller 164, a command signal is sent to the nozzle assembly 210 to cease orifice adjustment. In this event, the solenoid 266 is deactivated so that the solenoid plunger 268 is retracted, as shown in FIG. 12. Here, the swing arm 260 continues to rotate with the nozzle shaft 230 until the spring-loaded plunger 262 again aligns with the hole 264 in the rotating nut 254, whereupon the spring-loaded plunger 262 reengages within the hole 264. When engaged, the swing arm 260 carries with it the rotating nut 254 and relative rotational movement therebetween stops. Even though the rotating nut 254 rides on top of a thrust bearing 258, there is sufficient friction (due to upward force of the springs 240) that the rotating nut 254 remains temporarily stationary until the spring-loaded plunger 262 drops into the hole 264 of the rotating nut 254. It can be seen that when the solenoid 266 is not energized, the default position of the spring-loaded plunger 262 is engagement with the hole 264 in the rotating nut 254.

According to an important feature of the invention, the orifice surfaces can be lapped to remove residue that collects thereon as a result of the harsh flash evaporation environment within which the nozzle assembly 210 is situated. The lapping procedure can also remove grooves or other irregularities formed in the orifice surfaces during the flash evaporation process. To that end, the original orifice surfaces should be sufficiently thick so that after a number of lapping operations the restored orifice surfaces operate with optimum efficiency. The orifice surfaces can be constructed using a Norbide® material which is extremely hard and durable. The seat formed in the cylindrical member 222 as well as the nozzle ball 220 can be constructed of such material, or other suitable materials.

While not shown, the temperature and the pressure parameters of the liquid to be processed through the nozzle assembly 210 are monitored by the nozzle processor. To that end, a temperature and pressure sensor are attached to the pipe inside the nozzle assembly 210 that feeds the liquid to the high pressure connection 238 to which the nozzle member 222 is connected. During dynamic operation of the system, the temperature and the pressure of the liquid to be processed can be very high, and the closing of the nozzle orifice at such time can be dangerous. Preferably, when it is desired to lap the surfaces of the nozzle, the system processor either slows down the high pressure pump or shuts it off during the lapping process. The burner that heats the liquid to be processes is also controlled in a corresponding manner. In any event, the system processor controls the water purification system during normal dynamic operation as well as during periods in which the nozzle surfaces are to be lapped and cleaned. However, as a redundant precaution, when the nozzle processor receives a lap command from the system processor, the nozzle processor first checks the temperature and pressure sensors to verify that the system has been prepared for the lapping process. If the temperature and pressure sensors indicate that such parameters are those of a fully operating system, the lap command will not be carried out until the pressure and temperature of the liquid has been reduced.

Those skilled in the art may find that spring-loaded apparatus other than the swing arm 260 can be used with equal effectiveness. For example, a one-piece resilient metal arm can be used as both the spring arm 260 and the plunger 262. In this case, one end of the resilient metal arm can be fastened to the nozzle shaft 230, and the other end formed with a depending plunger adapted for engaging within the hole 264 of the rotating nut 254. The resilient arm would be biased downwardly so that the plunger end is urged into the rotating nut hole 264. Other variations are well within the ambit of those skilled in the art.

When it is desired to lap the nozzle surfaces, which include the seat of the tubular seat member 222 and an annular surface of the nozzle head 220, a lap command can be dispatched from the controller 164 to the nozzle assembly 210. The lap command causes the solenoid 266 to be actuated to stop rotation of the rotating nut 254. The motor 226 is then caused to rotate in such a direction that the rotating nut 254 effectively moves up on the threaded portion 256 of the nozzle shaft 230. Alternatively, the upstream liquid pressure in the system can be reduced so that the springs 240 relax and the orifice is closed. The upward movement of the rotating nut 254 continues until the orifice surfaces are in contact. The solenoid 266 is then deactivated, to allow the rotating nut 254 to again rotate with the nozzle shaft 230. As the nozzle shaft 230 continues to rotate while the orifice surfaces are in contact, such surfaces are lapped to remove residue thereon and to wear the orifice surfaces for optimum contact therebetween. During the lapping procedure, the processing of the liquid to be purified by the system can be changed so that the liquid bypasses the flash evaporation step and is rerouted to the input of the system, or to a temporary holding tank, to be reprocessed when normal processing resumes. Once the lapping procedure is completed, the solenoid 266 is again energized to stop rotational movement of the rotating nut 254 so that the desired orifice size can be established, whereupon normal liquid purification processing resumes.

The controller or processor 164 of the water purification system communicates with many components of the system, including the nozzle assembly 210. Not every action of the nozzle assembly 210 need be controlled by the system controller 164. Rather, a simple lap command can be dispatched from the main system controller 164 to a processor located within the nozzle assembly 210. The nozzle processor can receive the high level command and control the motor 226 and the solenoid 266 to carry out the particular operations commensurate with the command. The nozzle processor can be located on a printed circuit board, together with the other electrical components, such as a memory, a DC power supply, filters, etc., fastened within the housing 212 of the nozzle assembly 210. An electrical connector can be fastened within an opening in the housing top 214 and connected to a mating connector connected by wires to the system processor 164.

Figure 13:
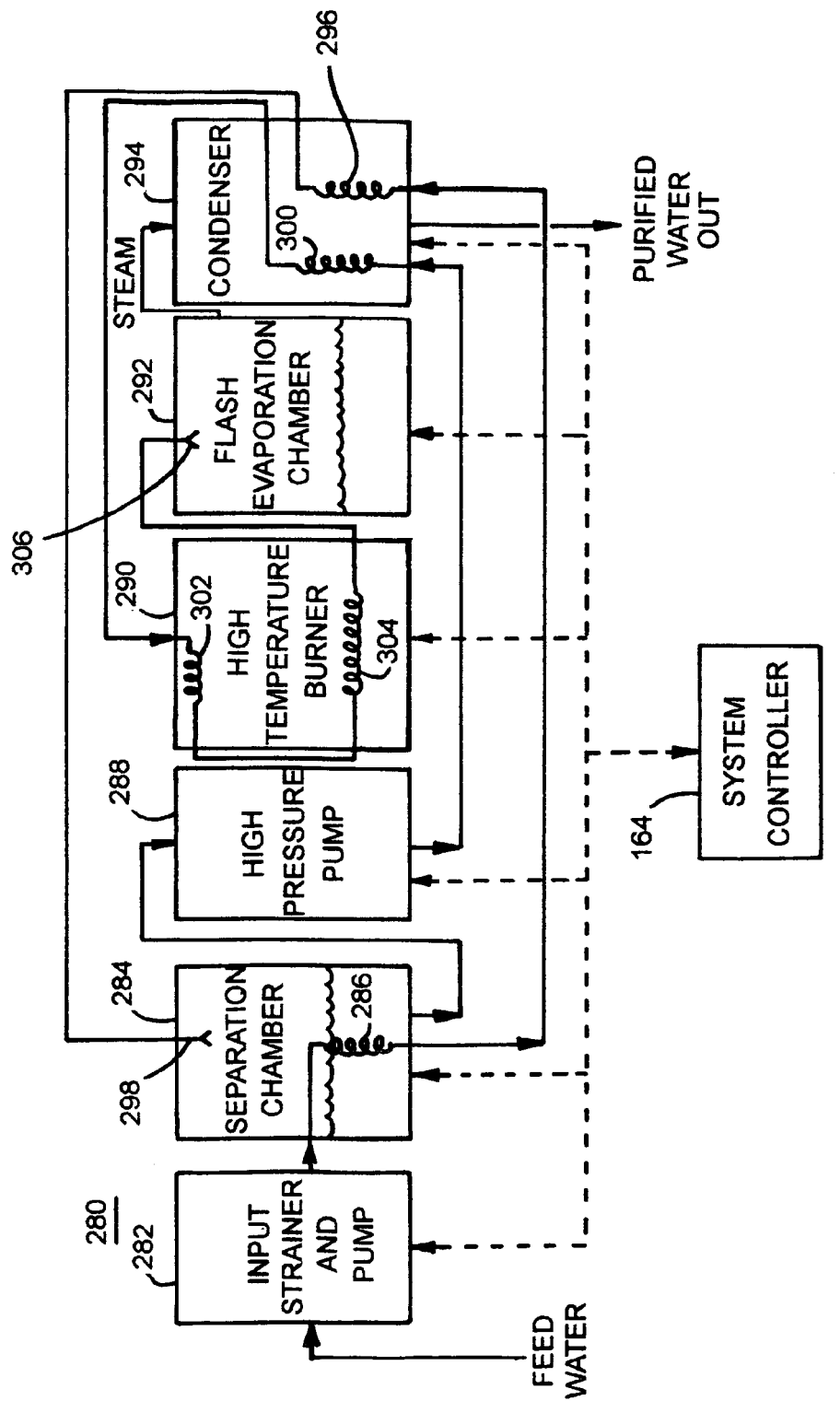
FIG. 13 is a block diagram of a water purification system employing the nozzle assembly of the invention.

FIG. 13 illustrates the fundamentals of a flash evaporation system 280 of the type in which the nozzle assembly 210 can be advantageously practiced. In this embodiment, the nozzle assembly 210 can be utilized in both a low pressure stage as well as in a high pressure stage of the system 280. An input strainer and low pressure pump stage 282 receives the feed water or the production water to be processed and passes the same through a series of mesh screens to remove the particulate matter. After processing by the input stage 282, the production water is at a temperature of about 80-100 degrees F. The filtered production water is pumped through a coil 286 in the separation chamber 284.

Production fluid is pumped into the top of the separation chamber 284 and flashed by a nozzle 298 in an atmosphere of about 212 degrees F., at about atmosphere pressure, or a few psi above atmospheric pressure. The hot water that does not flash into steam settles to the bottom of the separation chamber 284. The thermal energy of this hot water heats the filtered production water flowing through the coil 286 to about 160-200 degrees F., and at the same time cools the unflashed water in the bottom of the separation chamber 284 to about 140 degrees F. The preheated production water is transferred from the separation chamber 284 to a coil 296 in a condenser stage 294. In the condenser stage 294, the production water flowing through the coil 296 is elevated in temperature to around 212 degrees F., as steam is input into the condenser stage 294 from the flash evaporation chamber 292 to be condensed into pure water.

As noted above, the preheated 212 degrees F., production water processed in the top of the separation chamber 284 passes through the nozzle 298 and when sprayed into the atmospheric pressure, the spray flashes into steam and other vapors. The vapors are withdrawn from the top of the separation chamber 284 and coupled to the burner 290 to be used as supplemental fuel for combustion. The steam is withdrawn from the top of the separation chamber 284 via an outlet (not shown) and converted to water by a small condenser, also not shown. The nozzle assembly 298 can be generally of the type described above in connection with FIG. 9. The volatile vapors can be burned in the high temperature burner 290. The nozzle 298 located in the separation chamber 284 processes the liquid in which the input strainer and pump stage 282 has removed the larger particulate matter. The liquid being processed downline by the system 280 does not require additional particulate matter and liquid filtering components, as the strained liquid is coupled directly to the nozzle 298, after being preheated. The ability of the nozzle 298 to process liquids therethrough which have large amounts of particulate matter, gases, toxic substances, and varying density fluids, substantially reduces the cost of the system, as elaborate filters and other related subsystems are not required. Indeed, and as noted above, the nozzle 298 can process liquid sludges therethrough, where other prior art nozzles would plug and require constant maintenance. Stated another way, the nozzle 298 can process liquids having large amounts of suspended particles, over 200,000 ppm, and continue to operate. If maintenance is required, then the nozzle assembly 298 can enter a mode before the purification system 280 stops functioning. In this mode, the nozzle surfaces are refurbished and cleaned and the assembly placed back into operation without removal of the nozzle assembly and without shutting down the entire process. The ions carried by the liquids are held in suspension by the high temperatures, and are eventually removed by the distillation in the flash evaporation chamber 292. The ions are effectively removed by the flash evaporation process which results in the purified form of water, with the ion-concentrated waste left behind as a waste sludge. The agitation of the liquids in the separation chamber 284 agitates the solids which allow them to be more easily removed.

The oils and water in the production liquid not flashed into respective vapors settle to the bottom of the separation chamber 284 and are separated by density, it being realized that the lighter density oils float on top of the heavier density water. As such, the upper layer of oil is removed via the nozzle assembly 298 and is carries out of the separation chamber 284. The unflashed liquid that collects at the bottom of the separation chamber 284 is coupled to a high pressure pump 288 where it is pumped under a pressure of about 2200 psi to a coil 300 where the high pressure liquid is further preheated in the condenser stage 294 to a temperature of about 212 degrees F.

The high pressure, high pressure liquid is the coupled from the condenser stage coil 300 to a burner stage 290 where the temperature of the high pressure liquid is further elevated to about 600 degrees F. Here, the high pressure liquid is heated in two stages. First, the high pressure liquid is first heated by a coil 302 located in the stack of the burner where the high temperature fumes exit the burner 29. The high pressure liquid is then further heated by a second coil 304 located directly in the burner chamber. The pressure liquid exiting the second coil 304 of the burner 290 is at a temperature of about 600 degrees F., and is fed to a nozzle assembly 306 located in the flash evaporation chamber 292. The nozzle assembly 306 can be of the type described above in connection with FIG. 9, but without the oil removal apparatus. The 2200 psi, 600 degrees F., liquid coupled to the flash evaporation chamber 292 is flashed at atmospheric pressure, whereupon substantial steam is produced from the water content thereof. The unflashed water and other byproducts settle as liquids and solids to the bottom of the flash evaporation chamber 292 and can be recirculated to the system input to be processed again, or can be coupled to downline flash evaporation and condenser stages to be further refined into pure water and waste products. Eventually, the waste products, which are substantially reduced in volume, can be removed from the system as a sludge and appropriately disposed of.

The high temperature steam produced by the flash evaporation stage 292 is coupled to the condenser stage 294 where it is condensed into the purified form of water when passed over the lower temperature coils 296 and 300. As described above, the production water is preheated in such coils 296 and 300 and at the same time serves to condense the steam into water. The purified form of water is extracted from the condenser stage 294 and used for drinking purposes, irrigation, or pumped into a lake, river or other source of natural water. The purified form of water can also be used in many manufacturing processes.

The system processor 164 is coupled to the various components of the water purification system 280 for control of the apparatus thereof, as well as coupled to various types of sensors that provide the processor 164 dynamic information concerning the operational status of the system. The system 280 can thus operate to purify liquids of many types, without human intervention, to accommodate and rectify changes occurring during the purification process.

Figure 14:
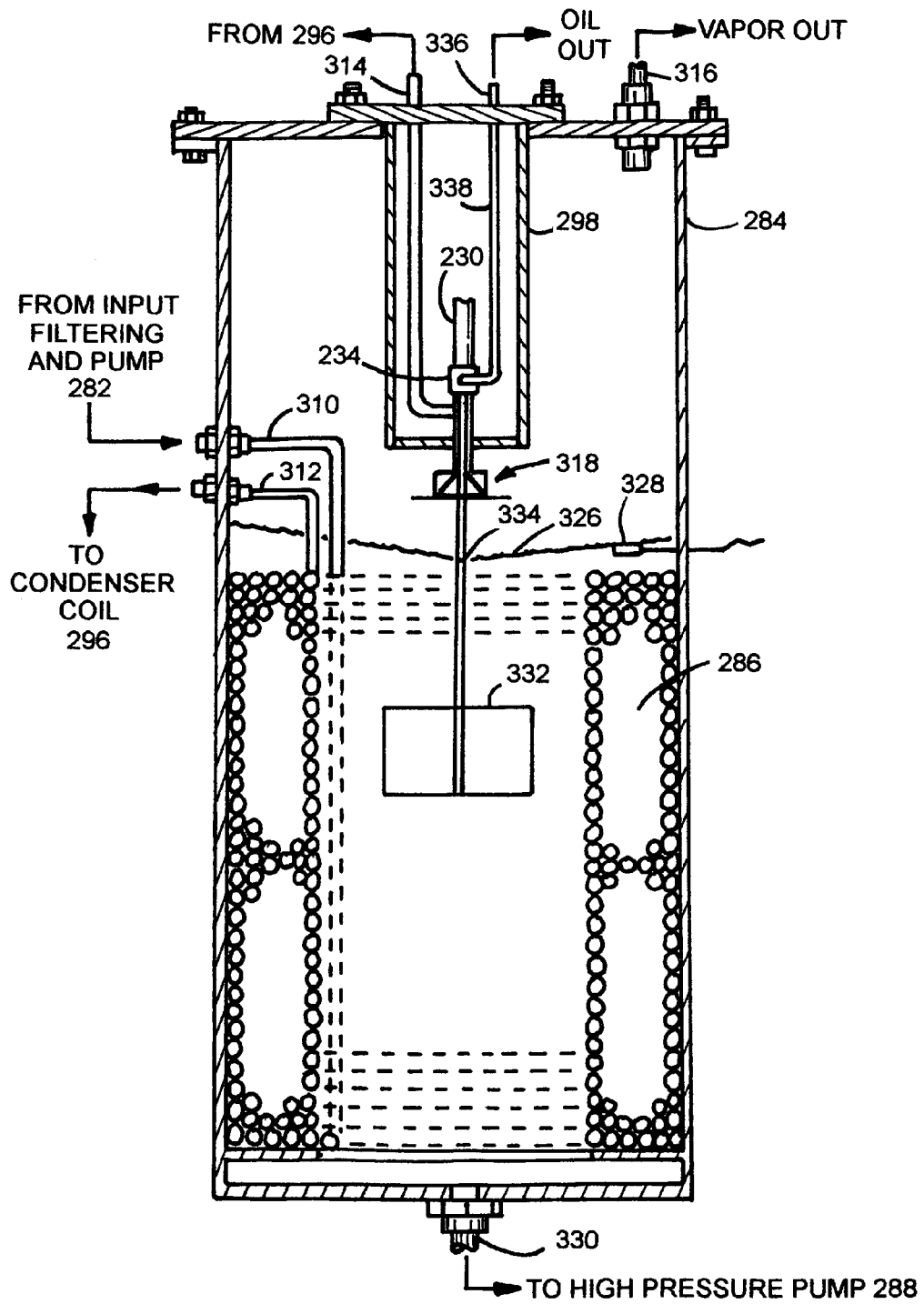
FIG. 14 is a sectional view of the separation stage of the water purification system of FIG. 13.

The details of the separation chamber 284 and the associated nozzle assembly 298 are illustrated in more detail in FIG. 14. Here, filtered production water enters the separation stage 284 via pipe 310 and circulates through the long heat transfer coil 286, starting at the bottom thereof. As the filtered production water flows upwardly in the coil 286, the water absorbs heat before exiting the separation chamber via the pipe 312. At the same time, the separation chamber 284 is effective to separate oil and vapors from the water portion of the production water. The hot (212 degrees F.) production water enters the nozzle assembly 298 via a pipe 314 and is coupled to the high pressure connection 238 (arrow 224) shown in the detailed drawing of FIG. 15, which is the nozzle assembly 298 employed in the separation chamber 284. The inlet pipe 314 carrying the high temperature liquid is preferably insulated to minimize the temperature in the nozzle assembly 210. The pressure of the hot production water forces the nozzle open to thereby flash any volatile liquid into a vapor. The volatile vapors are removed from the separation chamber 284 via the vapor outlet 316 located at the top of the stage 284 and captured and/or reused to generate heat in the processing system. In order to facilitate the processing of particulate matter, the inlet pipe 314 which carries the hot, high pressure liquid to the nozzle members, can be equipped with sonic apparatus to break the larger particles carried in the liquid into smaller particles for passing through the nozzle orifice without restriction. The pipe 314 can be constructed from a non-ferrous metal, such as copper, and a sonic coil disposed around the pipe 314. The sonic coil can be driven by a high frequency signal to generate a sonic signal sufficient to break the larger particles into smaller particles. Alternatively, a sonic transducer can be suspended in the pipe 314 and driven to break the particulate matter into smaller pieces. The driver in either instance can be placed on a printed circuit board located in the nozzle assembly 298.

The flashing of vapors via the nozzle device 318 are best described in connection with FIG. 15. The nozzle device 318 is somewhat different from that shown in FIG. 9, but otherwise the structure and function of the nozzle assembly 298 is the same. In this embodiment, the nozzle device 318 is constructed using a conical-shaped nozzle head 320 that seats within a conical-shaped seat 322. Pressurized hot production water forces the nozzle head 320 away from the seat 322 to form an orifice through which the hot production water is sprayed as minute particles onto a deflection plate 324. When the hot, pressurized production water exits the nozzle orifice into the lower pressure of the separation chamber 298, the some of the volatile liquids flash into corresponding vapors. The flashed vapors rise in the separation chamber 284. The liquids that do not flash into vapors, including the remaining oil and water, are deflected by the deflection plate 324 and sprayed radially outwardly toward the cylindrical wall of the separation chamber 284. Because the density of the oils is lighter than the corresponding density of water, the oils move inwardly and float on top of the water. The heavier density water content moves down to the bottom of the separation chamber 284. Described below is a feature where the liquid in the separation chamber 284 is swirled around to facilitate separation of the oils from the water content. As noted above, the hot water in the bottom of the separation chamber 284 preheats the filtered production water flowing through the long heat transfer coil 286.

The hot water and oil floating thereon in the separation chamber 284 continue to accumulate until they reach a level 326 shown in FIG. 14, whereupon a float sensor 328 detects the same and signals the system processor 164 to reduce the speed of the pump in the filter and pump stage 282 to maintain the predetermined liquid level 326. The liquid level 326 is also a function of the amount of water removed from the bottom of the separation stage 284 via coupling 330 and coupled to the high pressure pump 288.

The removal of the oils from the separation chamber 284 is carried out in the following manner through the use of the nozzle assembly 298. Broadly described, the nozzle shaft 230 of the nozzle assembly 298 is not only connected to the nozzle head 320, but also extends therethrough and is connected to an underlying paddle 332. The portion 333 of the nozzle shaft 230 that extends below the oil extraction collar 234, and through the nozzle head 320 is tubular for carrying oil upwardly therethrough. Located a short distance below the predetermined level 326 in the separation chamber 284 is an inlet hole 334 formed in the tubular portion 333 of the nozzle shaft 230. A suction applied to the oil outlet 336 at the top of the nozzle assembly 298 is effective to draw the oil floating on the water through the inlet hole 334, up the tubular portion 333 of the nozzle shaft 230, out of the oil extraction collar 234 and upwardly through a flexible tube 338 to the outlet 336 of the nozzle assembly 298. The oil extraction collar 234 is constructed in a standard manner to prevent rotation, but nevertheless allows the coupling of oil therethrough from the tubular portion 333 to the pipe 338, while the nozzle shaft 230 rotates therein. The flexible tube 338 accommodates up and down movements of the oil extraction collar 234 with the nozzle shaft 230.

The nozzle assembly 298 is also effective to swirl or rotate the liquid in the bottom of the separation chamber 284 using the paddle 332. As noted above, the paddle 332 is connected to the rotating tubular portion 333 of the nozzle shaft 230. Accordingly, the paddle 332 rotates at the same speed as the nozzle head 320 during processing of the production liquid through the separation chamber 284. The rotational speed of the paddle 332 is sufficient to cause the surface of the liquid to form a vortex, as shown in FIG. 14. The inlet hole 334 of the tubular portion 333 of the nozzle shaft 230 is located at the center of the vortex. Moreover, the rotational movement of the liquid by the paddle 332 facilitates the separation of the oil from the water in the separation chamber 284, it being realized that the heavier density water is displaced outwardly toward the wall of the separation chamber 284, whereupon the water flows to the bottom, and the oil tends to remain on top and at the center of the pool of liquid. This facilitates extraction of the oil by the apertured tube 333 located at the center of the vortex.

As shown in FIG. 14, the oil extraction apparatus as well as the paddle 332 are fastened to the nozzle assembly 298 and thus can be removed from the separation chamber 284 as a unit. Thus, if repair or replacement is desired, the entire nozzle unit can be removed and replaced with a different nozzle unit, by the easy removal of the bolts, disconnection of the electrical connectors and tubing connections, and lifting out of the separation chamber 298. Replacement of a different nozzle unit is the reverse operation of the removal of the old nozzle unit.

The versatility of the nozzle unit can be enhanced by utilizing replaceable or interchangeable nozzle heads so that the same general nozzle unit can be employed in either the separation chamber 284 or the flash evaporation chamber 292. In other words, the nozzle head can be adapted for changing between that of FIG. 9 and that of FIG. 15 so that a single nozzle assembly can be used in both applications. To that end, the same general nozzle head can be utilized in both applications, rather than a conical nozzle head in one application and a ball-shaped nozzle head in the other application. For example, the nozzle head 320 and seat 322 shown in FIG. 15 can be used in both applications.

Figure 15:
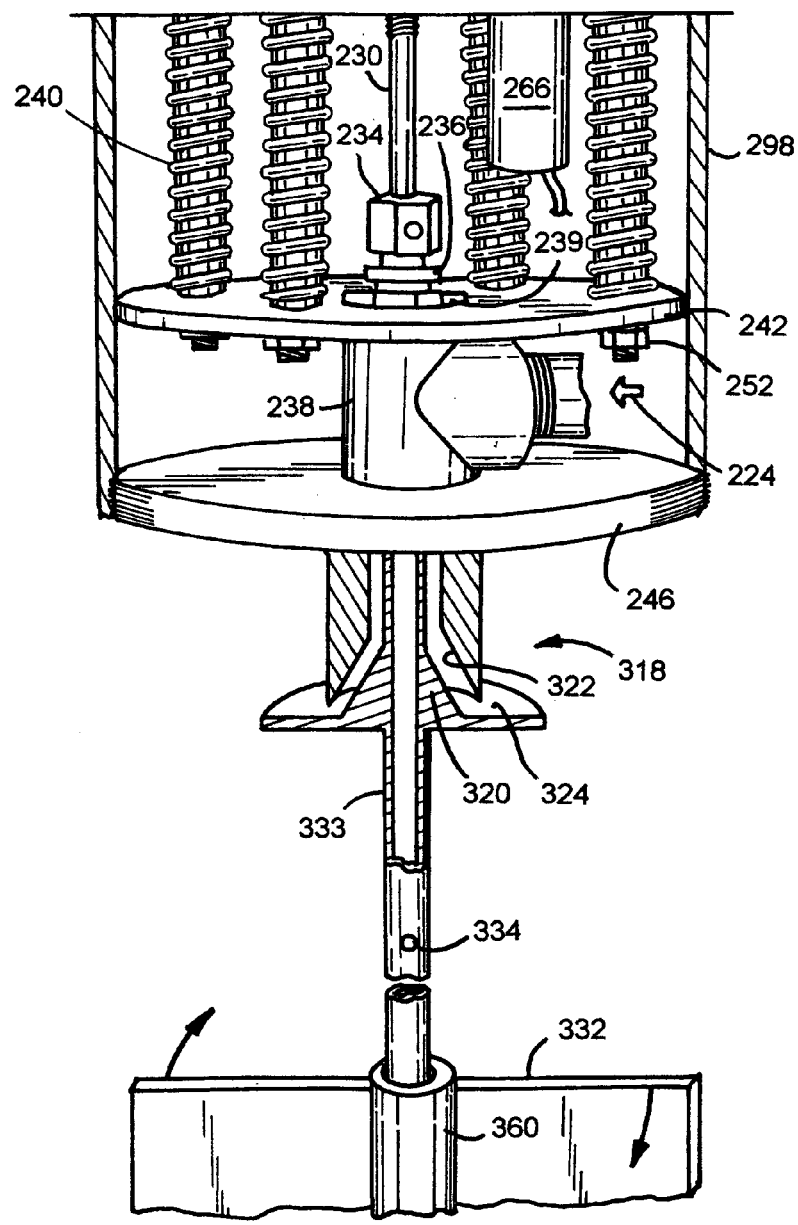
FIG. 15 is a partial sectional view of the nozzle assembly equipped with nozzle head that has a paddle attached thereto.
Figures 16, 17, 18:
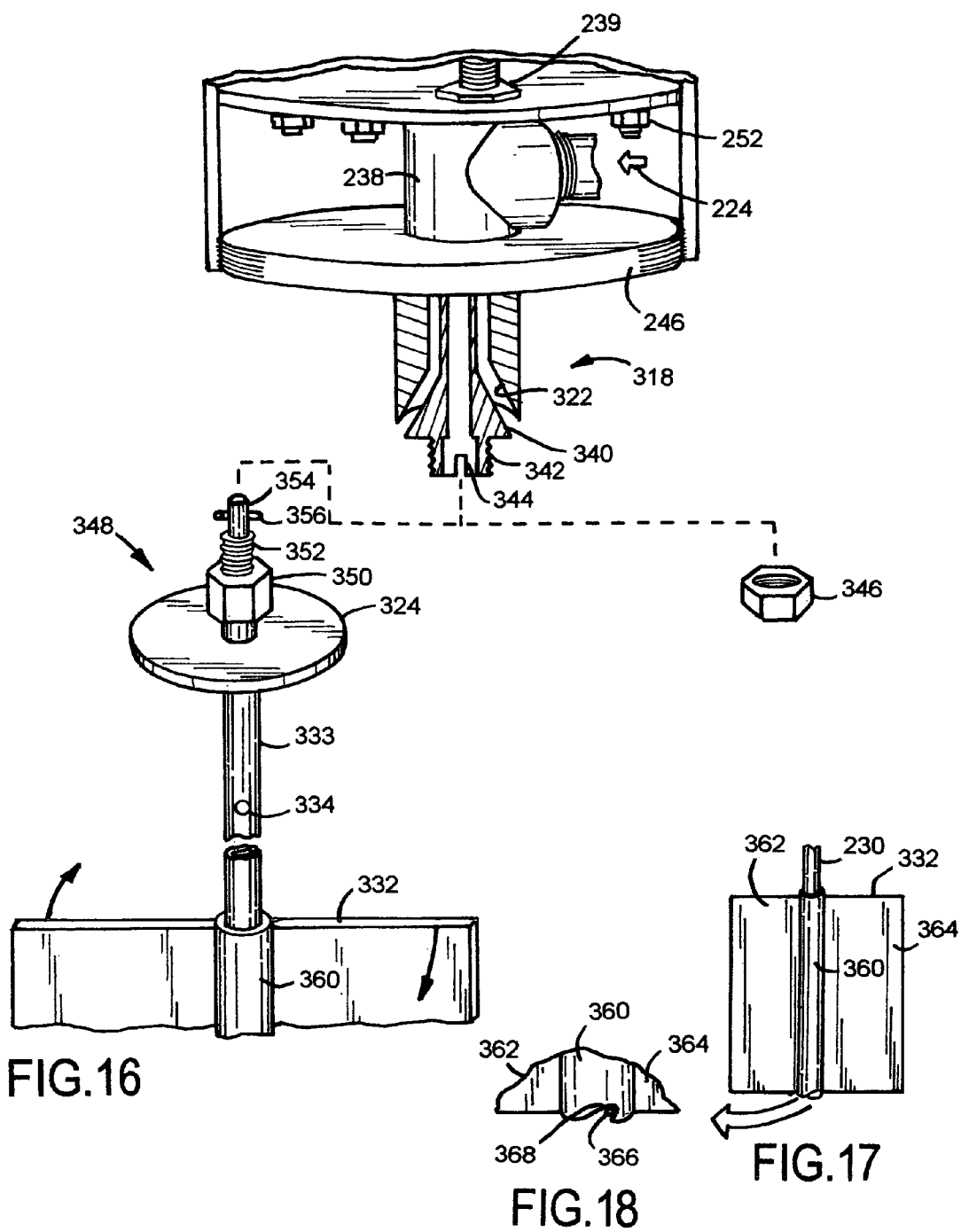
FIG. 16 is a partial sectional view of the nozzle assembly having a nozzle head adapted for operating with or without the paddle.
FIG. 17 illustrates the ratchet by which the paddle is driven.
FIG. 18 is an enlarged view of the ratchet of FIG. 17.

FIG. 16 illustrates a nozzle head adapted for accommodating the nozzle functions of both that of FIGS. 9 and 15. The nozzle head 340 is constructed with a conical face that seats with the conical seat 322. The bottom of the nozzle head 340 has a threaded tubular stub 342 with a notch 344 formed therein. Either the cap 346 or the paddle assembly 348 can be connected to the threaded tubular stub 342. If the nozzle unit of FIG. 9 is to be utilized in the flash evaporation stage 292, then the cap 346 is simply fastened to the threaded stub 342 to close the end of the threaded tubular stub 342. Conversely, if the nozzle unit of FIG. 15 is to be utilized in the separation chamber 284, then the paddle assembly 348 is simply fastened to the threaded tubular stub 342. In fastening the paddle assembly 348 to the threaded tubular stub 342, the elongate nut 350 is threaded down on the threaded part 352, the tubular end 354 is inserted into the bottom of the threaded tubular stub 342 of the nozzle head 340. Then, the prongs 356 are pushed into the respective slots 344 of the threaded tubular stub 342, and the elongate nut is threaded onto both the threaded tubular stub 342 and the threaded end 352 of the paddle assembly 348. The nesting of the prongs 356 in the respective slots 344 prevents inadvertent rotation of the paddle assembly 348 with respect to the nozzle head 340. The paddle assembly 348 is thus fastened to the nozzle head 340 and can be used in the separation chamber 284. Many other arrangements for fastening different nozzle apparatus to the nozzle unit can be devised by those skilled in the art.

In the separation chamber 284, where the pressure is less than that within the flash evaporation chamber 292, the nozzle assembly can be adjusted so that the orifice size is of the desired area based on the upstream pressure. If a sufficiently smaller operating pressure is desired, then lower-force springs can be used to reduce the force on the nozzle head 340. The nozzle assemblies described herein can also be modified without departing from the concepts of the invention. For example, the nozzle head and the nozzle seat device can be reversed so that the nozzle shaft rotates and moves the nozzle seat device rather than the nozzle head.

FIG. 17 illustrates the ratchet by which the paddle 332 is driven. The bottom of the tubular portion 333 of the nozzle shaft 230 extends through a tube 360 which is welded integral with the paddle blades 362 and 364, two of which are shown. The paddle 332 can have as many blades as desired. FIG. 18 illustrates the ratchet by which the nozzle shaft 230 is attached to the paddle 332. A lateral pin 366 is fastened through the end of the nozzle shaft 230, and extends outwardly therefrom. The bottom annular edge of the paddle tube 360 has formed therein two notches, one shown as numeral 368. The notches are formed so that when the nozzle shaft 230 rotates in one direction, the ends of the pin 366 catch in the respective notches 368 and turn the paddle 332. When the nozzle shaft 230 is rotated in the opposite direction, the ends of the pin 366 move out of the respective notches 368 and do not turn the paddle 332.

Figure 19:
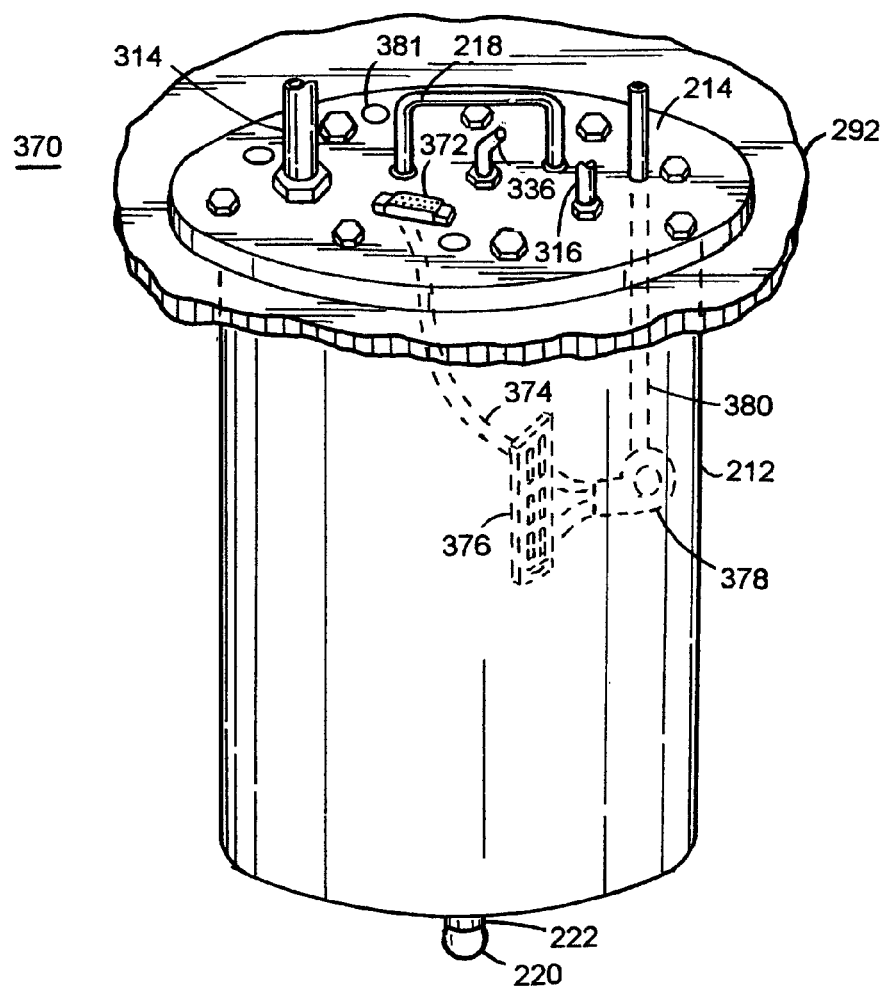
FIG. 19 is an isometric view of a nozzle assembly, showing in phantom a circulation fan for cooling the internal components of the assembly.

FIG. 19 illustrates another embodiment of a nozzle assembly 370 having a ventilation system for cooling the internal components of the assembly 370. The internal components of the nozzle assembly 370 can be substantially the same as those described above in the other embodiments. The nozzle embodiment 370 is adapted for use with the flash evaporation chamber 292 shown in FIG. 13. To that end, the oil outlet 336 would be capped, as would the vapor outlet 316. The high pressure, high temperature liquid would be inlet to the nozzle system via the inlet tube 314. The electrical inputs and outputs would be taken from the nozzle assembly 370 via the connector 372. Conductors 374 are coupled from the connector 372 to a printed circuit board 376 which would have the sensor, drive and control circuits, including a local processor and associated circuits, if desired.

In the event that certain components of the nozzle assembly require cooling, a fan 378 is mounted within the nozzle assembly 370. The cool air inlet to the fan 378 is obtained via a duct 380 that has an inlet end fastened to the top lid of the nozzle assembly 370. Fresh cool air can be coupled externally to the inlet of the air duct 380. The fan 378 is shown directing the cool air to the printed circuit board 376. However, the fan 378 can be directed to other components of the nozzle assembly 370. Indeed, there may be a number of fans coupled to a common source of cool air to direct the cool air to the respective nozzle assembly components. As an alternative, the fan 378 can be mounted external to the nozzle assembly 370 to blow cool air down the duct 380. In this instance, the duct 380 would have one or more outlets that direct the cool air to the various components requiring the same. The ventilation air input to the nozzle assembly 370 by the fan 378 is exhaust through a number of screen-covered holes or ports 381 formed in the top 214.

In the various embodiments of the expansion nozzle described above, various features have been shown and enumerated. It is to be understood that the different features can be employed in the different embodiments, and are not limited to the embodiment associated therewith. Those skilled in the art may find it advantageous to modify the features, or add other features to the expansion nozzles described. For example, the pin engagement with the idler gear can be replaced with a magnetic clutch. The pin arrangement with the idler gear can be replaced with a mating tooth engagement or other male/female engagement mechanism. The arrangement of components of the expansion nozzle can be changed so that some of the components are outside of the expansion chamber and the other components are inside to remove the various components from the harsh environment inside the expansion chamber. The DC motor employed in the preferred embodiment can be replaced with a reversible AC motor, or a stepper motor. In the embodiments described above, the stem extends through the body of the nozzle so that the axial movement thereof is controlled from one end of the nozzle to control the orifice located on the other end of the nozzle body. However, the principles and concepts of the invention can be employed by controlling the movement of a nozzle stopper, all at the same end of the body of the nozzle without having to extend a stem through the body of the nozzle.

Thus, while the preferred and other embodiments of the invention have been disclosed with reference to specific expansion nozzles and associated equipment, and associated methods of operation thereof, it is to be understood that many changes in detail may be made as a matter of engineering choices without departing from the spirit and scope of the invention, as defined by the appended claims.

What is claimed is:

1. A nozzle for use with a pressurized liquid, comprising:
    a first and second nozzle member, at least one of said first or second nozzle member being movable with respect to the other nozzle member to provide an orifice having a variable area therebetween for spraying the pressurized liquid therefrom;
    at least one spring biasing said first and second nozzle members toward a closed position in which the orifice is closed, said spring having a force counteracted by a force of the pressurized liquid during dynamic operation of the nozzle to move the movable nozzle member and change the orifice area;
    electrical drive apparatus providing rotary power;
    a nozzle shaft connected to the movable nozzle member, said nozzle shaft driven by said electrical drive apparatus for rotating said movable nozzle member; and
    a spring force adjustment mechanism for adjusting the force of the spring to thereby adjust the force by which the pressurized liquid moves the movable nozzle member.

2. The nozzle of claim 1, wherein said electrical drive apparatus comprises an electrical reversible motor.

3. The nozzle of claim 2, herein said spring force adjustment mechanism comprises a threaded nut mated with threads on said nozzle shaft, and when said threaded nut is rotated with respect to said nozzle shaft in a first direction, said spring force is increased, and when said threaded nut is rotated with respect to said nozzle shaft in a second direction, said spring force is decreased.

4. The nozzle of claim 3, further including a stationary plate and a movable plate, said spring is located between said stationary plate and said movable plate, and wherein movement of said threaded nut is effective to move said movable plate and adjust a tension on said spring.

5. The nozzle of claim 1, wherein said spring force adjustment mechanism includes a threaded nut mated with threads on said nozzle shaft, and when said threaded nut is rotated with respect to said nozzle shaft, a tension on said spring is adjusted, and further including a stop mechanism for stopping rotation of said threaded nut with respect to said nozzle shaft to thereby stop adjustment of the tension of said spring.

6. The nozzle of claim 5, wherein said stop mechanism includes a catch fixed to said nozzle shaft and rotatable therewith, the catch of said stop mechanism is adapted for engaging with said threaded nut for releasably fixing thereto so that said threaded nut rotates with said stop mechanism and said nozzle shaft when fixed thereto.

7. The nozzle of claim 6, wherein catch includes a spring-loaded plunger that is engageable within a hole in said threaded nut.

8. The nozzle of claim 7, further including a catch release comprising a solenoid plunger adapted for removing the spring-loaded plunger from the hole in said threaded nut to thereby release the stop mechanism so that the threaded nut can be rotated with respect to said nozzle shaft.

9. The nozzle of claim 8, wherein said stop mechanism comprises a swing arm attached to said nozzle shaft, and said spring-loaded plunger is attached to said swing arm for movement into and out of the hole from one side of said threaded nut, and said solenoid plunger is located on an opposite side of said threaded nut so that when extended said solenoid plunger pushes said spring-loaded plunger out of the hole in said threaded nut and releases said stop mechanism from said threaded nut.

10. The nozzle of claim 1, wherein said nozzle shaft is tubular through at least a portion thereof for carrying a liquid therethrough.

11. The nozzle of claim 10, further including a liquid extraction collar around said tubular portion of said nozzle shaft, said liquid extraction collar fixed against rotational movement and having a channel for receiving liquid from the tubular portion of the nozzle shaft and carrying the liquid away from the nozzle shaft.

12. The nozzle of claim 1, further including a housing for containing said nozzle and protecting said nozzle from environments outside said housing, and said first and second nozzle members mounted to an outside surface of said housing.

13. The nozzle of claim 1, wherein said movable nozzle member comprises a nozzle head connected to said nozzle shaft.

14. The nozzle of claim 1, further including a paddle shaft connected to said movable nozzle member, and including a paddle connected to said paddle shaft so that said paddle rotates with said nozzle shaft, said paddle adapted for swirling a liquid and moving the liquid.

15. The nozzle of claim 14, wherein said shaft includes a hole therein and a tubular section for carrying the liquid being swirled by said paddle.

16. The nozzle of claim 1, wherein said first nozzle member comprises a nozzle head, and wherein said nozzle head is adapted for removable attachment of a paddle thereto so that said paddle rotates with said nozzle shaft.

17. A nozzle for use with a pressurized liquid, comprising:
- a nozzle head and a nozzle seat, said nozzle head being movable with respect to said nozzle seat to provide an orifice having a variable area therebetween for spraying the pressurized liquid therefrom;
- a nozzle shaft connected to said nozzle head, said nozzle shaft having a threaded portion;
- a stationary plate and a movable plate;
- a plurality of springs located between said stationary plate and said movable plate, said nozzle seat fixed against movement with said stationary plate, said springs biasing said movable plate away from said stationary plate, said springs having a force counteracted by a force of the pressurized liquid during dynamic operation of the nozzle to move the movable plate and change the orifice area;
- a reversible motor for rotating said nozzle shaft and said nozzle head clockwise and counterclockwise;
- a threaded nut engaged with the threaded portion of said nozzle shaft, said threaded nut having a hole therein, and said threaded nut bearing against said movable plate so that when said threaded nut moves along the threaded portion of said nozzle shaft, said movable plate moves axially with said threaded nut;
- a spring-loaded plunger attached to said nozzle shaft, said spring-loaded plunger adapted for engagement within the hole in said threaded nut so that when said nozzle shaft rotates said spring-loaded plunger rotates therewith and carries with it the threaded nut when engaged with said spring-loaded plunger; and
- a solenoid attached to said stationary plate, said solenoid having a plunger adapted for engagement within the hole in said threaded nut, and when said solenoid plunger engages within the hole in said threaded nut, said solenoid plunger displaces said spring-loaded plunger from the threaded nut hole to thereby stop rotational movement of said threaded nut while said nozzle shaft remains rotatable.

18. A method of operating a nozzle for use with a pressurized liquid, comprising:
- spacing a first nozzle member from a second nozzle member to form an orifice so that the pressurized liquid is sprayed therefrom;
- rotating the first nozzle member with respect to the second nozzle member during dynamic operation of the nozzle to grind particulate matter lodged in the orifice;
- maintaining rotation of said first nozzle member during axial movement thereof until a nozzle surface of the first nozzle member contacts a nozzle surface of the second nozzle member, whereby relative rotational movement between the first and second nozzle members is effective to lap the nozzle surfaces; and
- after lapping the nozzle surfaces, moving the first nozzle member axially away from the second nozzle member to form an orifice so that the pressurized liquid is sprayed between the lapped surfaces of the respective nozzle members.

19. The method of claim 18, further including spring biasing the first nozzle member into contact with the second nozzle member, and counteracting a force of the spring with a force of the pressurized liquid during dynamic operation of said nozzle to move the first nozzle member and change an area of the orifice.

* * * * *